US011069101B2

(12) United States Patent  
Okuma

(10) Patent No.: US 11,069,101 B2  
(45) Date of Patent: Jul. 20, 2021

(54) DATA PROCESSING METHOD AND DATA PROCESSING DEVICE

(71) Applicant: CASIO COMPUTER CO., LTD., Tokyo (JP)

(72) Inventor: Kentaro Okuma, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/016,475

(22) Filed: Jun. 22, 2018

(65) Prior Publication Data

US 2018/0374248 A1  Dec. 27, 2018

(30) Foreign Application Priority Data

Jun. 23, 2017  (JP) .............................. JP2017-122892

(51) Int. Cl.

| G06T 11/20 | (2006.01) |
| G09B 23/18 | (2006.01) |
| G06T 11/60 | (2006.01) |

(52) U.S. Cl.  
CPC ............ G06T 11/206 (2013.01); G06T 11/60 (2013.01); G09B 23/181 (2013.01); *G06T 2210/32* (2013.01)

(58) Field of Classification Search  
CPC ... G06T 11/206; G06T 11/60; G06T 2210/32; G09B 23/181; G06Q 50/20; G06Q 50/205; H04L 61/2069  
See application file for complete search history.

(56) References Cited

U.S. PATENT DOCUMENTS

| 5,535,324 A | * | 7/1996 | Alvarez | .................. G06F 40/18 |
|  |  |  |  | 715/209 |
| 5,739,823 A | * | 4/1998 | Akaza | .................... G06F 15/025 |
|  |  |  |  | 345/440 |
| 6,466,229 B1 | * | 10/2002 | Nagao | ....................... G06T 1/60 |
|  |  |  |  | 345/621 |

(Continued)

FOREIGN PATENT DOCUMENTS

| EP | 2998876 A2 | 3/2016 |
| JP | H08263257 A | 10/1996 |

(Continued)

OTHER PUBLICATIONS

Extended European Search Report (EESR) dated Sep. 13, 2018 issued in European Application No. 18178671.6.

(Continued)

*Primary Examiner* — Charles L Beard  
(74) *Attorney, Agent, or Firm* — Holtz, Holtz & Volek PC

(57) ABSTRACT

A data processing method includes: outputting output information, the output information including coordinate system setting information to specify a correspondence between each of one or more coordinate axes of a coordinate system and each of attributes each of which is assigned to each of the one or more coordinate axes, thereby enabling an image generation device including a control unit to acquire the output information and to generate an image including a graph drawn in a coordinate system, which is set in accordance with the correspondence specified by the coordinate system setting information of the acquired output information, based on data on the attribute.

10 Claims, 14 Drawing Sheets

| DATA TYPE | ITEM | VALUE 1 (FUNCTION CALCULATOR 10A) | VALUE 2 (FUNCTION CALCULATOR 10B) | VALUE 3 (FUNCTION CALCULATOR 10C) |
|---|---|---|---|---|
| FIRST FORMAT DATA | HORIZONTAL AXIS | VOLTAGE V (V) | VOLTAGE V (V) | TIME t (s) |
|  | VERTICAL AXIS | CURRENT I (A) | CURRENT I (A) | POWER P (W) |
|  | COORDINATES OF DISPLAY RANGE (Xmin, Xmax, Ymin, Ymax) | Xamin, Xamax, Yamin, Yamax | Xbmin, Xbmax, Ybmin, Ybmax | Xcmin, Xcmax, Ycmin, Ycmax |
|  | REGRESSION EQUATION OF REGRESSION GRAPH | y=ax+b | y=ax²+bx+c | y=ax²+bx+c |
| SECOND FORMAT DATA | DISPLAY MODE (TYPE, FILLING COLOR, LINE COLOR, SIZE) OF PLOTTED POINT | CIRCLE, WHITE, BLACK, 10pt | CIRCLE, WHITE, RED, 10pt | CIRCLE, WHITE, BLUE, 10pt |
|  | DISPLAY MODE (TYPE, COLOR, THICKNESS) OF PLOTTED LINE | CHAIN LINE, BLACK, 3pt | ONE-DOT CHAIN LINE, RED, 3pt | SOLID LINE, BLUE, 3pt |

(56) References Cited

U.S. PATENT DOCUMENTS

| | | | | |
|---|---|---|---|---|
| 8,064,817 | B1* | 11/2011 | Ziv-El | G09B 7/00 345/156 |
| 8,196,057 | B2* | 6/2012 | Yoshizawa | G06F 9/455 715/773 |
| 8,527,909 | B1* | 9/2013 | Mullany | G06T 11/206 715/863 |
| 9,098,731 | B1* | 8/2015 | Amy | G06K 9/3208 |
| 9,111,458 | B2* | 8/2015 | Michalowski | G09B 7/02 |
| 9,113,833 | B2 | 8/2015 | Mansouri et al. | |
| 9,117,375 | B2* | 8/2015 | Labine | G09B 19/02 |
| 9,195,430 | B2* | 11/2015 | Okano | G06F 3/1415 |
| 9,576,383 | B2* | 2/2017 | Bous | G06T 11/206 |
| 9,665,259 | B2* | 5/2017 | Lee | G06F 3/0412 |
| 9,697,629 | B1* | 7/2017 | Vetter | G06T 11/60 |
| 9,741,151 | B2* | 8/2017 | Breedvelt-Schouten | G06T 13/80 |
| 9,817,563 | B1* | 11/2017 | Stokes | H04L 43/045 |
| 9,818,211 | B1* | 11/2017 | Gibb | G06T 11/60 |
| 9,838,490 | B2* | 12/2017 | Akae | H04M 1/0266 |
| 9,910,966 | B2 | 3/2018 | Mansouri et al. | |
| 10,042,811 | B2* | 8/2018 | Yoshizawa | G06F 17/16 |
| 10,109,086 | B1* | 10/2018 | Bakshi | G06T 11/206 |
| 10,192,329 | B2* | 1/2019 | Suzuki | G06T 11/206 |
| 10,210,132 | B2* | 2/2019 | Ono | G06F 15/0225 |
| 10,347,017 | B2* | 7/2019 | Ruble | G06F 9/451 |
| 10,366,061 | B2* | 7/2019 | Dunne | G06F 16/26 |
| 10,748,312 | B2* | 8/2020 | Ruble | G06F 3/40 |
| 10,809,159 | B2* | 10/2020 | Neeley | G06Q 20/085 |
| 10,817,148 | B2* | 10/2020 | Akae | G06T 11/206 |
| 2002/0002420 | A1* | 1/2002 | Hirai | G05B 19/4099 700/187 |
| 2002/0068990 | A1* | 6/2002 | Yamazaki | G05B 19/4086 700/187 |
| 2002/0115050 | A1* | 8/2002 | Roschelle | G09B 7/00 434/350 |
| 2002/0193900 | A1* | 12/2002 | Kinoshita | G01S 13/723 700/115 |
| 2004/0012588 | A1* | 1/2004 | Lulis | G06T 11/206 345/440 |
| 2004/0072136 | A1* | 4/2004 | Roschelle | G09B 7/00 434/350 |
| 2004/0181307 | A1* | 9/2004 | Hirai | G05B 19/4103 700/194 |
| 2004/0223002 | A1* | 11/2004 | Fukaya | G06F 1/1626 345/619 |
| 2005/0071020 | A1* | 3/2005 | Yamazaki | G05B 19/4086 700/56 |
| 2006/0095231 | A1* | 5/2006 | Okazaki | G05B 23/0267 702/183 |
| 2007/0046668 | A1* | 3/2007 | Bertini | G06F 17/5018 345/428 |
| 2007/0159481 | A1* | 7/2007 | Abe | G06T 11/206 345/440 |
| 2008/0278494 | A1* | 11/2008 | Ginsberg | G06T 11/206 345/440 |
| 2008/0278495 | A1* | 11/2008 | Minamide | G06T 11/206 345/440 |
| 2009/0002334 | A1* | 1/2009 | Karoji | G09B 19/0053 345/173 |
| 2009/0254597 | A1* | 10/2009 | Karoji | G06F 15/02 708/130 |
| 2009/0307587 | A1* | 12/2009 | Kaneko | G06F 3/0486 715/700 |
| 2010/0058250 | A1* | 3/2010 | Stannard | G06F 40/166 715/856 |
| 2010/0083161 | A1* | 4/2010 | Yoshizawa | G06F 9/455 715/773 |
| 2010/0198903 | A1* | 8/2010 | Brady | G06Q 50/20 709/201 |
| 2010/0225649 | A1* | 9/2010 | Okano | G06T 11/206 345/440 |
| 2010/0227304 | A1* | 9/2010 | Horikawa | G09B 5/14 434/350 |
| 2010/0231596 | A1* | 9/2010 | Matsuda | G06F 15/0225 345/440 |
| 2010/0235771 | A1* | 9/2010 | Gregg, III | G06T 11/206 715/769 |
| 2010/0313155 | A1* | 12/2010 | Willekes | G06F 40/166 715/769 |
| 2011/0254862 | A1* | 10/2011 | Okano | G09B 19/02 345/634 |
| 2011/0283231 | A1* | 11/2011 | Richstein | G06T 11/206 715/810 |
| 2012/0050328 | A1* | 3/2012 | Karoji | G06K 9/00402 345/636 |
| 2012/0180002 | A1* | 7/2012 | Campbell | G06F 40/18 715/863 |
| 2012/0251997 | A1* | 10/2012 | Kojo | G09B 7/07 434/379 |
| 2013/0046483 | A1* | 2/2013 | Mansouri | G01N 33/48792 702/23 |
| 2013/0113824 | A1* | 5/2013 | Kai | G06T 11/206 345/629 |
| 2014/0053091 | A1* | 2/2014 | Hou | G06F 3/04883 715/769 |
| 2014/0119674 | A1* | 5/2014 | Das | G06K 9/00476 382/284 |
| 2014/0210828 | A1* | 7/2014 | Fleizach | G06F 3/0488 345/467 |
| 2014/0267296 | A1* | 9/2014 | Neeley | G01D 7/08 345/440 |
| 2014/0317570 | A1* | 10/2014 | Endo | G06F 3/04847 715/825 |
| 2014/0365947 | A1* | 12/2014 | Karoji | G06F 3/04847 715/773 |
| 2014/0365954 | A1* | 12/2014 | Yoshizawa | G06F 3/0485 715/784 |
| 2015/0015504 | A1* | 1/2015 | Lee | G06T 11/206 345/173 |
| 2015/0178963 | A1* | 6/2015 | Lu | G06T 11/206 345/440 |
| 2015/0187105 | A1* | 7/2015 | Endo | G06T 11/001 345/589 |
| 2015/0187106 | A1* | 7/2015 | Endo | G06T 11/206 345/440 |
| 2015/0262396 | A1* | 9/2015 | Devarajan | G06F 3/0486 345/440.1 |
| 2015/0268845 | A1* | 9/2015 | Endo | G06F 3/04847 715/771 |
| 2015/0310646 | A1* | 10/2015 | Karoji | G06T 11/206 345/440 |
| 2015/0317457 | A1 | 11/2015 | Mansouri et al. | |
| 2015/0334338 | A1* | 11/2015 | Lim | H04N 21/4108 348/515 |
| 2016/0041944 | A1* | 2/2016 | Karoji | G06T 11/206 345/440 |
| 2016/0055232 | A1* | 2/2016 | Yang | G06F 3/04842 707/740 |
| 2016/0063674 | A1* | 3/2016 | Karoji | G05B 15/02 345/665 |
| 2016/0077725 | A1* | 3/2016 | Maeda | G06F 3/04847 715/833 |
| 2016/0085716 | A1* | 3/2016 | Yoshizawa | G06F 17/16 708/146 |
| 2016/0085717 | A1* | 3/2016 | Ono | G06F 17/16 708/130 |
| 2016/0085845 | A1* | 3/2016 | Yoshizawa | G06F 16/381 709/204 |
| 2016/0086362 | A1* | 3/2016 | Suzuki | G06T 11/206 345/440 |
| 2016/0086512 | A1* | 3/2016 | Yoshizawa | G06F 15/0225 434/201 |
| 2016/0086513 | A1* | 3/2016 | Uejima | H04L 67/12 434/201 |
| 2016/0267700 | A1* | 9/2016 | Huang | G06F 40/166 |
| 2016/0274781 | A1* | 9/2016 | Wilson | G06F 3/04817 |
| 2016/0307344 | A1* | 10/2016 | Monnier | G06F 3/04845 |
| 2016/0381159 | A1* | 12/2016 | Akae | H04L 67/22 455/566 |

(56) References Cited

U.S. PATENT DOCUMENTS

| | | | |
|---|---|---|---|
| 2017/0004638 A1* | 1/2017 | Csenteri | G06T 11/206 |
| 2017/0024016 A1* | 1/2017 | Ho | G06F 16/9038 |
| 2017/0024178 A1* | 1/2017 | Jeong | G06T 3/40 |
| 2017/0052798 A1* | 2/2017 | Okuma | G06F 9/44505 |
| 2017/0052865 A1* | 2/2017 | Okuma | G06F 13/4068 |
| 2017/0098018 A1* | 4/2017 | Watanabe | G06T 3/0087 |
| 2017/0127030 A1* | 5/2017 | Chida | G06T 11/60 |
| 2017/0139894 A1* | 5/2017 | Welch | G06F 17/246 |
| 2017/0140402 A1* | 5/2017 | Doi | G06Q 30/0202 |
| 2017/0147277 A1* | 5/2017 | Carney | G06F 3/1462 |
| 2017/0206684 A1* | 7/2017 | Duncker | G06F 40/143 |
| 2017/0300186 A1* | 10/2017 | Kuhar | G06F 3/0482 |
| 2017/0355412 A1* | 12/2017 | Takeshita | B60L 50/20 |
| 2018/0005418 A1* | 1/2018 | Kim | G06T 11/206 |
| 2018/0067625 A1* | 3/2018 | Kim | G06T 11/206 |
| 2018/0137024 A1* | 5/2018 | Madsen | G06F 11/3452 |
| 2018/0137667 A1* | 5/2018 | Kindelsberger | G06F 16/9024 |
| 2018/0165846 A1* | 6/2018 | Stella | G06T 11/206 |
| 2018/0182138 A1* | 6/2018 | Okuma | G06F 15/02 |
| 2018/0188944 A1* | 7/2018 | Cho | G06F 3/0416 |
| 2018/0191988 A1* | 7/2018 | Takahashi | G06T 11/206 |
| 2018/0204388 A1* | 7/2018 | Tanaka | G06T 15/10 |
| 2018/0204389 A1* | 7/2018 | Tanaka | G06T 19/20 |
| 2018/0262834 A1* | 9/2018 | Cho | G06F 3/167 |
| 2018/0276180 A1* | 9/2018 | Hatayama | G09B 23/02 |
| 2018/0349002 A1* | 12/2018 | Kindelsberger | G06F 3/0484 |
| 2018/0374247 A1* | 12/2018 | Suzuki | G06T 11/60 |
| 2019/0012553 A1* | 1/2019 | Maruchi | G06K 9/6288 |
| 2019/0041343 A1* | 2/2019 | Mori | G06T 11/206 |
| 2019/0065018 A1* | 2/2019 | Keam | G06F 3/14 |
| 2019/0095065 A1* | 3/2019 | Akae | G06F 3/0484 |
| 2019/0096103 A1* | 3/2019 | Tanaka | G06T 11/206 |
| 2019/0096366 A1* | 3/2019 | Akae | G06F 3/1454 |
| 2019/0295498 A1* | 9/2019 | Lee | G09G 5/005 |
| 2019/0318518 A1* | 10/2019 | Akae | G06T 11/206 |
| 2019/0371020 A1* | 12/2019 | Tanaka | G06T 11/206 |
| 2019/0385348 A1* | 12/2019 | Lee | G06T 11/60 |
| 2020/0005509 A1* | 1/2020 | Gibb | G06T 11/206 |
| 2020/0045568 A1* | 2/2020 | Kwon, II | H04W 24/08 |
| 2020/0286270 A1* | 9/2020 | Lymperopoulos | G06T 11/60 |
| 2021/0033497 A1* | 2/2021 | Neeley | G06T 11/206 |

FOREIGN PATENT DOCUMENTS

| | | |
|---|---|---|
| JP | 2003216588 A | 7/2003 |
| JP | 2004354725 A | 12/2004 |
| JP | 2007304656 A | 11/2007 |
| JP | 2014206894 A | 10/2014 |
| JP | 5824970 B2 | 12/2015 |

OTHER PUBLICATIONS

Zachariadou, et al., "A low-cost computer-controlled Arduino-based educational laboratory system for teaching the fundamentals of photovoltaic cells", European Journal of Physics, Institute of Physics Publishing, Sep. 11, 2012, vol. 33, No. 6, pp. 1599-1610.

Fx-CG20 Software Version 2.02 User's Manual, Oct. 13, 2015, E-CON 3 Mode (Data Logger Controller), URL: http://support.casio.jp/storage/pdf/004/fx-CG20_soft.J.pdf.

Japanese Office Action (and English language translation thereof) dated May 18, 2021 issued in Japanese Application No. 2017-122892.

* cited by examiner

FIG. 3

| SENSOR ID | SENSOR CHARACTERISTIC ||
|---|---|---|
| | TYPE | UNIT |
| 0001 | CURRENT | A |
| 0002 | VOLTAGE | V |
| 0003 | TEMPERATURE | °C |
| ⋮ | ⋮ | ⋮ |

| FORMULA (SCIENTIFIC THEORETICAL FORMULA) | SENSOR TYPE | REGRESSION EQUATION |
|---|---|---|
| $V = RI$ | I (CURRENT), V (VOLTAGE) | $y = ax + b$ |
| $W = VI = RI^2$ | I (CURRENT), V (VOLTAGE) | $y = ax^2 + bx + c$ |
| $L = L_0 + V_0 T + \frac{1}{2} aT^2$ | L (DISTANCE) | $y = ax^2 + bx + c$ |
| ⋮ | ⋮ | ⋮ |

⟨GRAPH DRAWING FORMAT DATA⟩

| DATA TYPE | ITEM | VALUE 1 (FUNCTION CALCULATOR 10A) | VALUE 2 (FUNCTION CALCULATOR 10B) | VALUE 3 (FUNCTION CALCULATOR 10C) |
|---|---|---|---|---|
| FIRST FORMAT DATA | HORIZONTAL AXIS | VOLTAGE V (V) | VOLTAGE V (V) | TIME t (s) |
| | VERTICAL AXIS | CURRENT I (A) | CURRENT I (A) | POWER P (W) |
| | COORDINATES OF DISPLAY RANGE (Xmin, Xmax, Ymin, Ymax) | Xamin, Xamax, Yamin, Yamax | Xbmin, Xbmax, Ybmin, Ybmax | Xcmin, Xcmax, Ycmin, Ycmax |
| | REGRESSION EQUATION OF REGRESSION GRAPH | $y = ax + b$ | $y = ax^2 + bx + c$ | $y = ax^2 + bx + c$ |
| SECOND FORMAT DATA | DISPLAY MODE (TYPE, FILLING COLOR, LINE COLOR, SIZE) OF PLOTTED POINT | CIRCLE, WHITE, BLACK, 10pt | CIRCLE, WHITE, RED, 10pt | CIRCLE, WHITE, BLUE, 10pt |
| | DISPLAY MODE (TYPE, COLOR, THICKNESS) OF PLOTTED LINE | CHAIN LINE, BLACK, 3pt | ONE-DOT CHAIN LINE, RED, 3pt | SOLID LINE, BLUE, 3pt |

FIG. 5B

⟨INTEGRATION FORMAT DATA⟩

| ITEM | VALUE |
|---|---|
| HORIZONTAL AXIS | TIME t (s) |
| VERTICAL AXIS | POWER P (W) |
| COORDINATES OF DISPLAY RANGE (Xmin, Xmax, Ymin, Ymax) | Xcmin, Xcmax, Ycmin, Ycmax |
| REGRESSION EQUATION OF REGRESSION GRAPH | $y = ax^2 + bx + c$ |

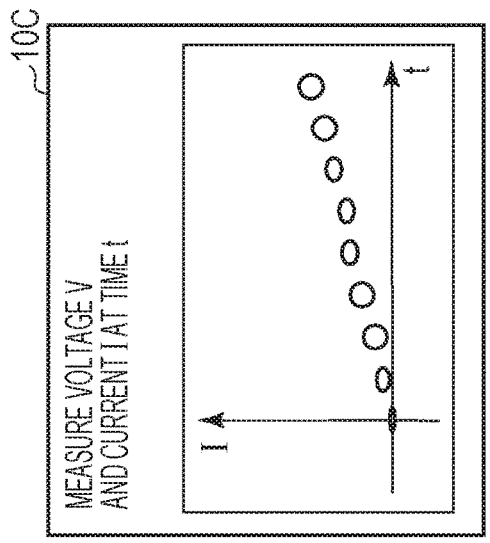
FIG. 12A1
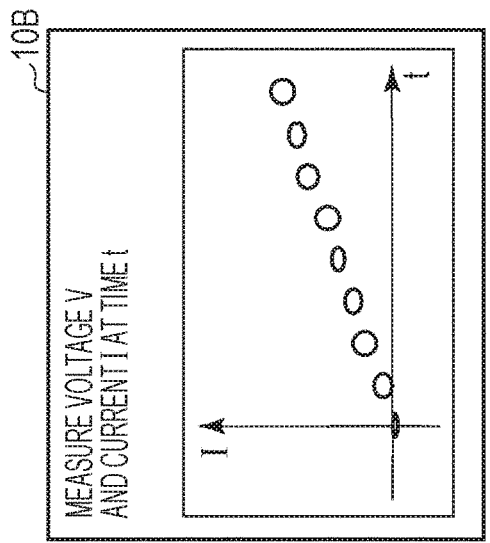
FIG. 12B1
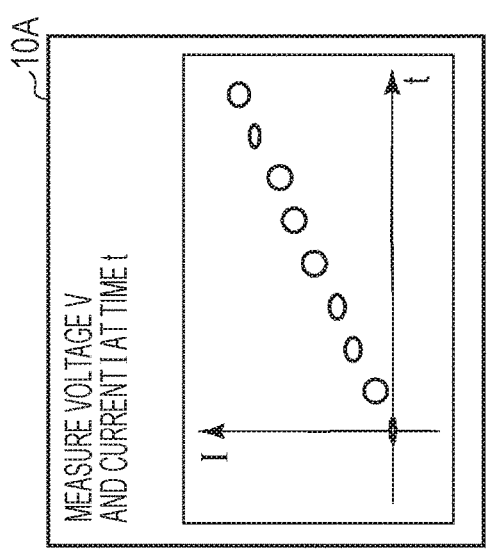
FIG. 12C1
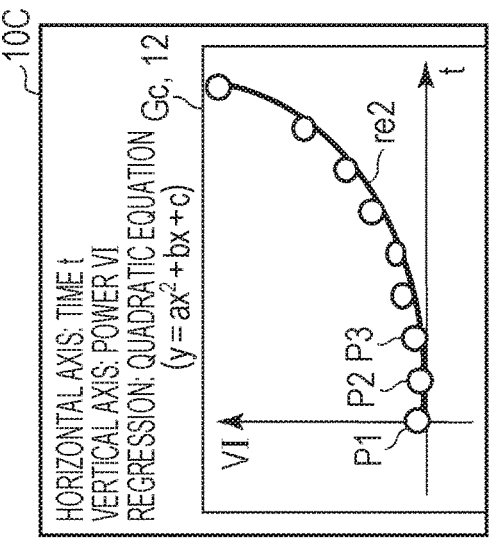
FIG. 12A2
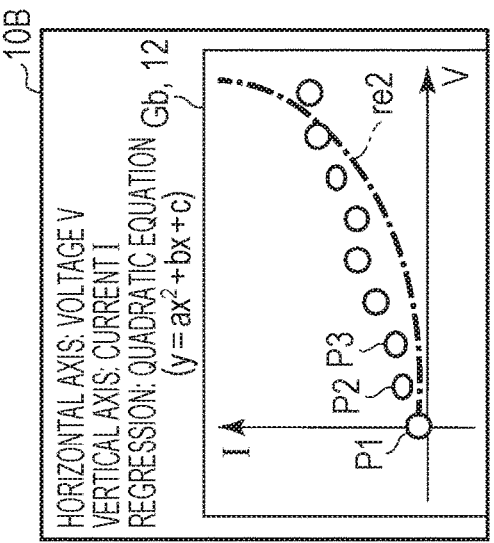
FIG. 12B2
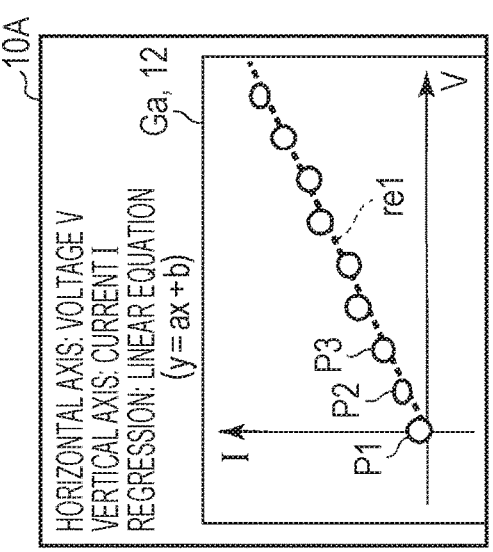
FIG. 12C2

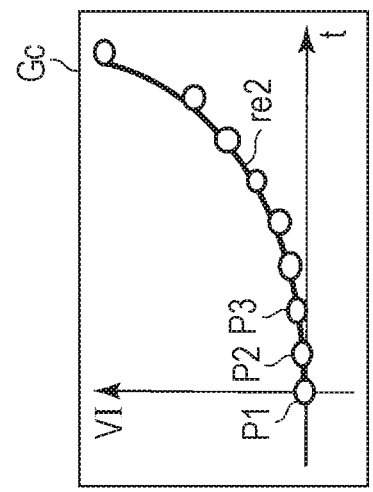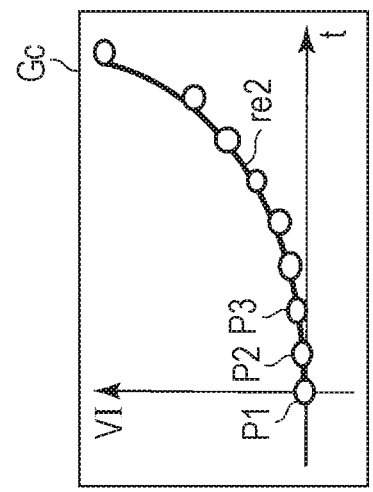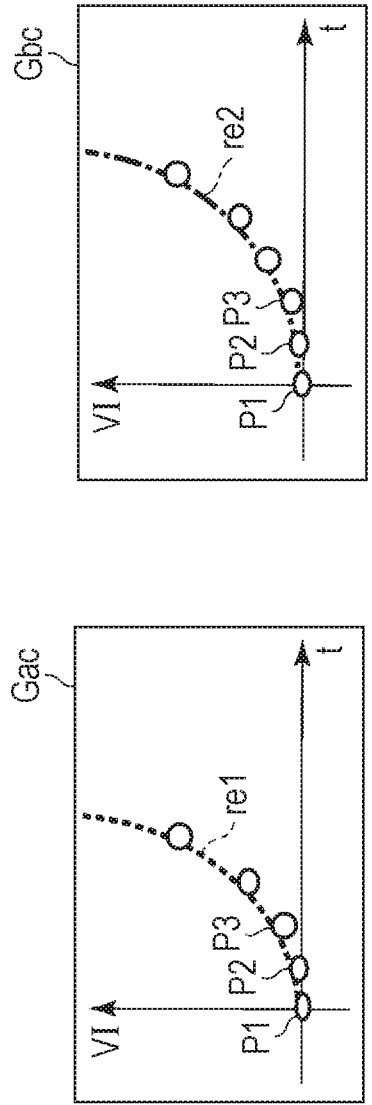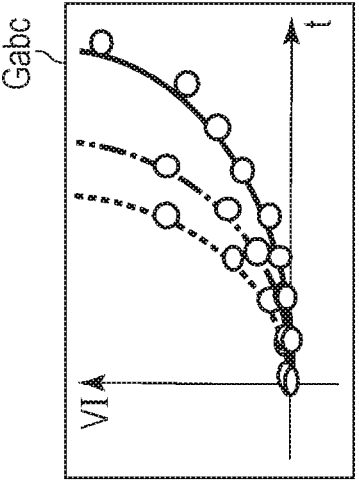

DATA PROCESSING METHOD AND DATA PROCESSING DEVICE

REFERENCE TO RELATED APPLICATION

This application is based upon and claims the benefit of priority from Japanese Patent Application No. 2017-122892, filed on Jun. 23, 2017, the entire contents of which are incorporated herein by reference.

BACKGROUND

1. Technical Field

The technical field relates to a data processing method and a data processing device configured to generate an image including a graph drawn in a set coordinate system based on measurement data regarding an arbitrary attribute.

2. Description of Related Art

Conventionally, there are a device using a desk calculator and a device using a personal computer as devices that draw a graph based on measurement data obtained by a sensor.

In either case, for example, various scientific characteristics such as a voltage, a current, a pressure, and a temperature are measured by the sensor, and the measurement data is plotted in a coordinate system having separately set coordinate axes during the measurement or after the measurement, whereby the graph is displayed on a display.

For example, a device as in "Casio Computer Co., Ltd., "fx-CG20 Software Version 2.02 User's Manual", [online], Oct. 13, 2015, E-CON 3 Mode (Data Logger Controller), [searched on Feb. 23, 2017], Internet <URL: http://support-.casio.jp/storage/pdf/004/fx-CG20_soft.J.pdf>" has been known.

In general, such a drawing device is used in lessons in schools in many cases. In the lessons, for example, each student transfers data measured by carrying out an experiment to a calculator owned by each student. Each student operates the calculator and plots measurement data transferred to the calculator in a coordinate system in which coordinate axes have been arbitrarily set by each student, thereby drawing a graph on a display of the calculator.

However, there is the only way of illustrating the display of the calculator directly to other students in order to notify other others of which graph that has been drawn based on the data measured by a certain student. In addition, if another student tries to draw a different graph with the same format as the graph format used by the certain student to draw the graph using different data measured by the other student, humans need to visually confirm graph of the certain student and read "a vertical axis, a horizontal axis, a regression pattern, a data display range" and "a display mode (a type, a color, or a thickness/size) of a line and a plotted point) and manually set a graph format of a calculator of the other student so as the obtain the same content as the read content.

BRIEF SUMMARY

A data processing method includes: outputting output information, the output information including coordinate system setting information to specify a correspondence between each of one or more coordinate axes of a coordinate system and each of attributes each of which is assigned to each of the one or more coordinate axes, thereby enabling an image generation device including a control unit to acquire the output information and to generate an image including a graph drawn in a coordinate system, which is set in accordance with the correspondence specified by the coordinate system setting information of the acquired output information, based on data on the attribute.

A data processing method includes: acquiring output information including coordinate system setting information output from an external device that outputs the coordinate system setting information to specify a correspondence between each of one or more coordinate axes of a coordinate system and each of attributes each of which is assigned to each of the one or more coordinate axes; and generating an image including a graph drawn in a coordinate system, which is set in accordance with the correspondence specified by the coordinate system setting information included in the acquired output information, based on data on the attribute.

A data processing device outputs output information such that an image generation device including a control unit acquires the output information including coordinate system setting information to specify a correspondence between each of one or more coordinate axes of a coordinate system and each of attributes each of which is assigned to each of the one or more coordinate axes, and generates an image including a graph drawn in a coordinate system, which is set in accordance with the correspondence specified by the coordinate system setting information of the acquired output information, based on data on the attribute.

A data processing device acquires one set of output information, output from an external device which outputs coordinate system setting information to specify a correspondence between each of one or more coordinate axes of a coordinate system and each of attributes each of which is assigned to each of the one or more coordinate axes, and generates an image including a graph drawn in a coordinate system, which is set in accordance with the correspondence specified by the coordinate system setting information included in the acquired one set of output information, based on data on the attribute.

A non-volatile recording medium has a program recorded thereon that is executable to control a computer of an electronic device including a control unit to execute: outputting one or more sets of output information thereby enabling an image generation device (server) including a control unit to acquire the one or more sets of output information including coordinate system setting information to specify a correspondence between each of one or more coordinate axes of a coordinate system and each of attributes each of which is assigned to each of the one or more coordinate axes and data on the attribute and to generate an image including one or more graphs drawn in a coordinate system, which is set in accordance with the correspondence specified by the coordinate system setting information included in one set of output information among the acquired one or more sets of output information, based on one or more pieces of the data included in the acquired one or more sets of output information.

BRIEF DESCRIPTION OF THE DRAWINGS

The components in the drawings are not necessarily to scale relative to each other.

FIG. 3 is a table illustrating content of a sensor database stored in a memory of the graph function calculator;

FIG. 4 is a table illustrating content of a formula database stored in the memory of the graph function calculator;

FIGS. 5A and 5B are tables illustrating an example of a data structure and data of graph drawing format data stored in the memory of the graph function calculator and an example of a data structure and data of integration format data stored in a memory of the tablet terminal;

FIGS. 12A1, 12A2, 12B1, 12B2, 12C1, and 12C2 are diagrams illustrating measurement result graphs drawn according to graph drawing processing in measurement data analysis processing of the graph function calculators in comparison among the respective calculators;

FIGS. 13A to 13D are views illustrating measurement result graphs of measurement data drawn with a specified graph drawing format based on each measurement data and graph drawing format data acquired from the plurality of graph function calculators according to the terminal processing of the tablet terminal;

DETAILED DESCRIPTION

Hereinafter, embodiments of the invention will be described with reference to the drawings.

Figure 1:
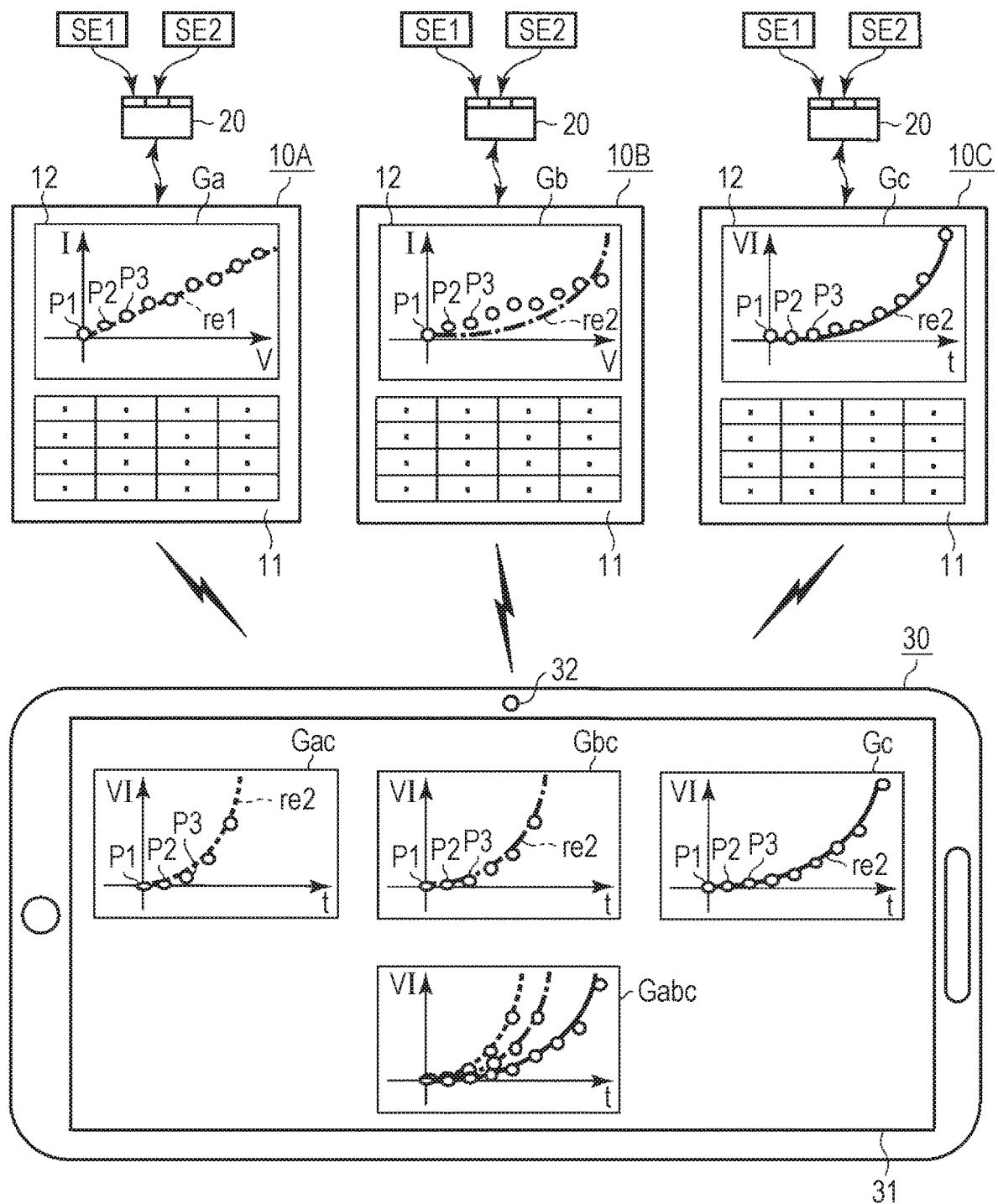
FIG. 1 is a view illustrating an external configuration of a graph drawing system including a graph function calculator and a tablet terminal according to an embodiment of an electronic device and a terminal device of the present invention.

FIG. 1 is a view illustrating an external configuration of a graph drawing system including a graph function calculator 10 (10A to 10C) and a tablet terminal 30 according to an embodiment of an electronic device and a terminal device of the present invention.

The graph drawing system is introduced in school lessons, for example, and is configured to include graph function calculators 10A, 10B, 10C, and so on, which are a plurality of electronic devices, and a tablet terminal 30 which is a terminal device. Here, it is assumed that the plurality of graph function calculators 10A, 10B, 10C, and so on are used by students, respectively, and the tablet terminal 30 is used by a teacher.

All of the graph function calculators 10A, 10B, 10C, and so on and the tablet terminal 30 have a communication connection function capable of data communication with each other.

Further, each of the graph function calculators 10A, 10B, 10C, and so on has a function of collecting measurement data measured by various sensors SEn via a data logger 20, a function of drawing a measurement result graph generated by plotting the collected measurement data as points P1, P2, and so on in a coordinate system having manually or automatically set horizontal axis and vertical axis together with a regression graph and displaying the measurement result graph and the regression graph on a display unit 12, and a function of outputting the collected measurement data and format data for drawing the displayed measurement result graph (graph setting format data, including each setting data of a horizontal axis, a vertical axis, and coordinates of a display range, regression equation data of the regression graph, a display mode (a type, a color, a size/thickness) of a plotted point and a line, and the like) to an external device such as the tablet terminal 30.

Incidentally, any of a function of outputting data to be output by converting the data into a QR code (registered trademark) and displaying the QR code on the display unit 12, a function of converting data into a voice code such as an ultrasonic wave and outputting the data from a voice output unit, a function of outputting data via a wireless or wired communication unit, and the like may be used as a function of outputting data of each of the graph function calculators 10A, 10B, 10C, and so on.

Further, the tablet terminal 30 has a function of receiving each measurement data and graph drawing format data output from each of the graph function calculators 10A, 10B, 10C, and so on (a function of decoding the QR code captured by a camera unit 32 to acquire data in the case of the QR code, and a function of decoding the voice code input by the voice input unit to acquire data in the case of the voice code), and a function of specifying any graph drawing format data among the respective pieces of received graph drawing format data, and drawing a measurement result graph of each received measurement data with the specified graph drawing format together with a regression graph and displaying the measurement result graph and the regression graph on a touch panel-equipped display unit 31.

For example, all of the graph function calculators 10A, 10B, and 10C illustrated in FIG. 1 collect measurement data I (A) and V (V) of a current I and a voltage V in a certain circuit, measured by a current sensor <1> SE1 and a voltage sensor<2> SE2. Based on graph drawing format data stored in a memory 14, the graph function calculator 10A of a student A plots the measurement data I (A) and V (V) as the points P1, P2, and so on in a coordinate system in which a vertical axis is set to the current I (A) and a horizontal axis is set to the voltage V (V), and displaying a measurement result graph Ga in which a regression graph re1 according to a linear regression equation is drawn.

Further, the graph function calculator 10B of a student B plots the measurement data I (A) and V (V) as the points P1, P2, and so on in a coordinate system in which a vertical axis is set to the current I (A) and a horizontal axis is set to the voltage V (V) based on the graph drawing format data stored in the memory 14, and displaying a measurement result graph Gb in which a regression graph re2 according to a quadratic regression equation is drawn.

Further, the graph function calculator 10C of a student C plots multiplied values VI (W) of measurement data as the points P1, P2, and so one in a coordinate system in which a vertical axis is set to the multiplied value VI (corresponding to power P (W)) of the current I (A) and the voltage V (V) and a horizontal axis is set to time T (s) based on the graph drawing format data stored in the memory 14, and displaying a measurement result graph Gc in which the regression graph re2 according to the quadratic regression equation is drawn.

Further, the tablet terminal 30 of the teacher receives the measurement data I (A) and V (V) of each of the graph function calculators 10A, 10B, and 10C and the graph drawing format data, draws a coordinate system set according to each setting data (a vertical axis VI (W), a horizontal axis T (s), Xcmin, Xcmax, Ycmin, Ycmax) of coordinates of the horizontal axis/vertical axis/display range included in the graph drawing format data of the graph function calculator 10C of the student C among the received data, and plots the multiplied values VI (W) as the points P1, P2, and so on based on measurement data of each of the graph function calculators 10A, 10B, and 10C. Further, the regression graph re2 according to the regression equation data (quadratic regression equation) of the regression graph included in the graph drawing format data of the graph function calculator 10C of the student C is drawn, whereby the measurement result graphs Gac, Gbc, and Gc are displayed.

In addition, the tablet terminal 30 also displays a measurement result integrated graph Gabc obtained by combining the respective measurement result graphs Gac, Gbc, and Gc, drawn according to the graph drawing format data of the graph function calculator 10C of the student C, in a superimposed manner.

Accordingly, it is possible to easily draw the measurement result graph of the measurement data collected by the graph function calculators 10A, 10B, and 10C of all the students, for example, according to the graph drawing format data set in the graph function calculator 10C of a certain student.

Figure 2:
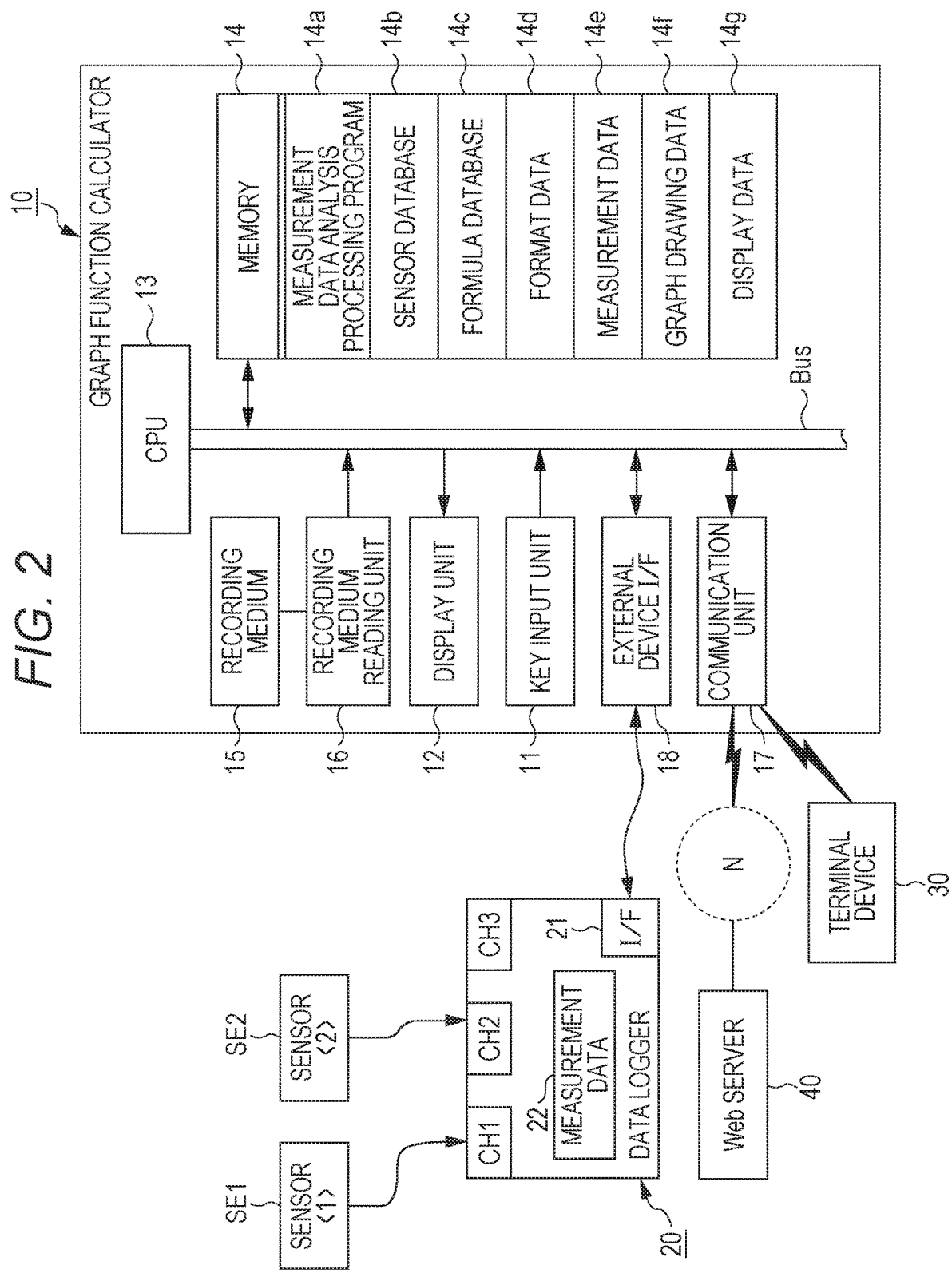
FIG. 2 is a block diagram illustrating a configuration of an electronic circuit of the graph function calculator according to the embodiment of the electronic device of the present invention.

FIG. 2 is a block diagram illustrating a configuration of an electronic circuit of the graph function calculator 10 according to the embodiment of the electronic device of the present invention.

The electronic device can be configured not only as the dedicated graph function calculator 10 but also as personal computers, smartphones, mobile phones, touch panel-type personal digital assistants (PDA), electronic books, portable game machines, and the like which have an input function of measurement data (scientific characteristics), a graph drawing function, and a data output function (in which a measurement data analysis processing program is mounted).

Incidentally, an electronic device in which physical keys (buttons) are not mounted as in the graph function calculator 10 displays a software keyboard similar to the keys of the graph function calculator 10 and executes processing in response to a key operation with respect to the software keyboard.

The electronic circuit of the graph function calculator 10 includes a CPU 13 which is a computer, and the CPU 13 is connected to a key input unit 11, a display unit 12, the memory 14, a recording medium reading unit 16, a communication unit 17, and an external device interface (I/F) 18 via a control and data bus Bus.

The CPU 13 controls an operation of each unit of the circuit in accordance with a measurement data analysis processing program 14a stored in the memory 14 and executes various types of calculation processing in response to a key input signal from the key input unit 11. The measurement data analysis processing program 14a may be stored in advance in the memory 14, may be read from an external recording medium 15 such as a memory card and stored in the memory 14 via the recording medium reading unit 16, or may be downloaded from an external web server 40 accessed via the communication unit 17 and a communication network (Internet) N and stored in the memory 14. The measurement data analysis processing program 14a is configured so as not to be rewritable by a user operation of the key input unit 11.

The memory 14 further stores a sensor database 14b and a formula database 14c as such data that is not rewritable by the user.

FIG. 3 is a table illustrating content of the sensor database 14b stored in the memory 14 of the graph function calculator 10.

In the sensor database 14b, types (sensor types) [Current], [Voltage], [Temperature], and so on of data (scientific characteristics) to be measured by the corresponding sensor and output units [A], [V], [° C.], and so on of measurement data (scientific characteristics) are stored in association with sensor IDs [0001], [0002], [0003], and so on for identifying various sensors that measure various types of data such as a current, a voltage, a temperature, a pressure, and an acceleration.

FIG. 4 is a table illustrating content of the formula database 14c stored in the memory 14 of the graph function calculator 10.

In the formula database 14c, various formulas (scientific theoretical formulas) including data of the corresponding type as an element of an equation and regression equations corresponding to the formulas, respectively, are stored in association with the types (sensor types) (one or a plurality of types) of the data to be measured by the various sensors stored in the sensor database 14b.

As illustrated in FIG. 4, two formulas representing a relationship between the current I (A) and the voltage V (V) are stored in the first row and the second row of the formula database 14c, and one formula representing a relationship between a distance L (m) and the time T (s) is stored in the third row.

Incidentally, a unit conversion equation, configured to convert the measurement data into the unit of the formula when a unit of measurement data obtained by the sensor is different from a unit of the equation element constituting the formula, is also stored in the formula database 14c.

Further, a format data area 14d, a measurement data area 14e, a graph drawing data area 14f, and a display data area 14g are secured in an area for storing rewritable data in the memory 14.

The above-described graph drawing format data is stored in the format data area 14d. FIG. 5A is a table illustrating an example of a data structure and data of the graph drawing format data stored in each of the memories 14 of the graph function calculators 10A, 10B, and 10C, and FIG. 5B is a table illustrating an example of a data structure and data of integration format data to be described later.

The graph drawing format data includes first format data and second format data. The first format data includes each setting data of the horizontal axis, the vertical axis, and the coordinates of the display range and the regression equation data of the regression graph, and the second format data includes data for specifying a display mode (a type, a filling color, a line color, or a size) of a plotted point and data for specifying a display mode (a type, a color, or a thickness) of a plotted line.

When the graph drawing processing illustrated in FIG. 8 to be described later is executed in each of graph function calculators 10A, 10B, and 10C, a unique coordinate system is set for each calculator. As a result, first format data of the graph function calculator 10A is set such that a horizontal axis is "Voltage V (V)", a vertical axis is "Current I (A)", coordinates of a display range are "Xamin, Xamax, Yamin, Yamax", and regression equation data of a regression graph is "Linear Equation (y=ax+b)" as illustrated in FIG. 5A. First format data of the graph function calculator 10B is set such that a horizontal axis is "Voltage V (V)", a vertical axis is "Current I (A)", coordinates of a display range are "Xbmin, Xbmax, Ybmin, Ybmax", and regression equation data of a regression graph is "Quadratic Equation (y=ax$^2$+ bx+c)". First format data of the graph function calculator 10C is set such that a horizontal axis is "Time T (s)", a vertical axis is "Power P (W)", coordinates of a display range are "Xcmin, Xcmax, Ycmin, Ycmax", and regression equation data of a regression graph is "Quadratic Equation (y=ax$^2$+bx+c)".

In each of the graph function calculators 10A, 10B, and 10C, display modes when measurement data is plotted are set as the second format data unique to each calculator. Although a predetermined setting value is set as a default value in the second format data of each of the graph function calculators 10A, 10B, and 10C, the setting value can be changed as appropriate based on a user operation or the like.

More specifically, second format data of the graph function calculator 10A is set such that display modes (a type, a filling color, a line color, and a size) of a plotted point are "Circle, White, Black, 10 pt" and display modes (a type, a color, and a thickness) of a plotted line are "Chain Line, Black Color, 3 pt" as illustrated in FIG. 5A. Similarly, second format data of the graph function calculator 10B is set such that display modes of a plotted point are "Circle, White, Red, 10 pt" and display modes of a plotted line are "One-Dot Chain Line, Black Color, 3 pt", and second format data of the graph function calculator 10C is set such that display modes of a plotted point are "Circle, White, Blue, 10 pt" and display modes of a plotted line are "Solid Line, Black Color, 3 pt".

In the measurement data area 14e, measurement data (scientific characteristics), measured by one or a plurality of sensors<1> SE1, sensors<2> SE2, and so on, input via the data logger 20 connected to the external device I/F 18, is stored.

In the graph drawing data area 14f, drawing data of the measurement result graph generated by plotting the measurement data stored in the measurement data area 14e based on data of a coordinate area (coordinate system) stored in the format data area 14d, is stored.

The display data area 14g has a memory area corresponding to a size of a display screen of a liquid crystal display unit constituting the display unit 12, and display data that needs to be displayed on the display screen is stored in this memory area as bitmap data (herein, data of the coordinate area and bitmap data developed according to the drawing data of the graph).

The data logger 20 is configured to include an I/F 21 configured for connection with the external device I/F 18, channels CH1, CH2, and so on configured for connection with the various sensors <1> SE1, sensors <2> SE2, and so on, and a measurement data memory 22 configured to temporarily store the measurement data (scientific characteristics) of the various sensors <1> SE1, sensors <2> SE2, and so on input via the channels CH1, CH2, and so on.

In the graph function calculator (electronic device) 10 configured in this manner, the CPU 13 controls the operation of each unit of the circuit in accordance with a command described in the measurement data analysis processing program 14a, and software and hardware operate in cooperation with each other, thereby realizing a measurement data analysis function as in the description on the operation which will be described later.

Figure 6:
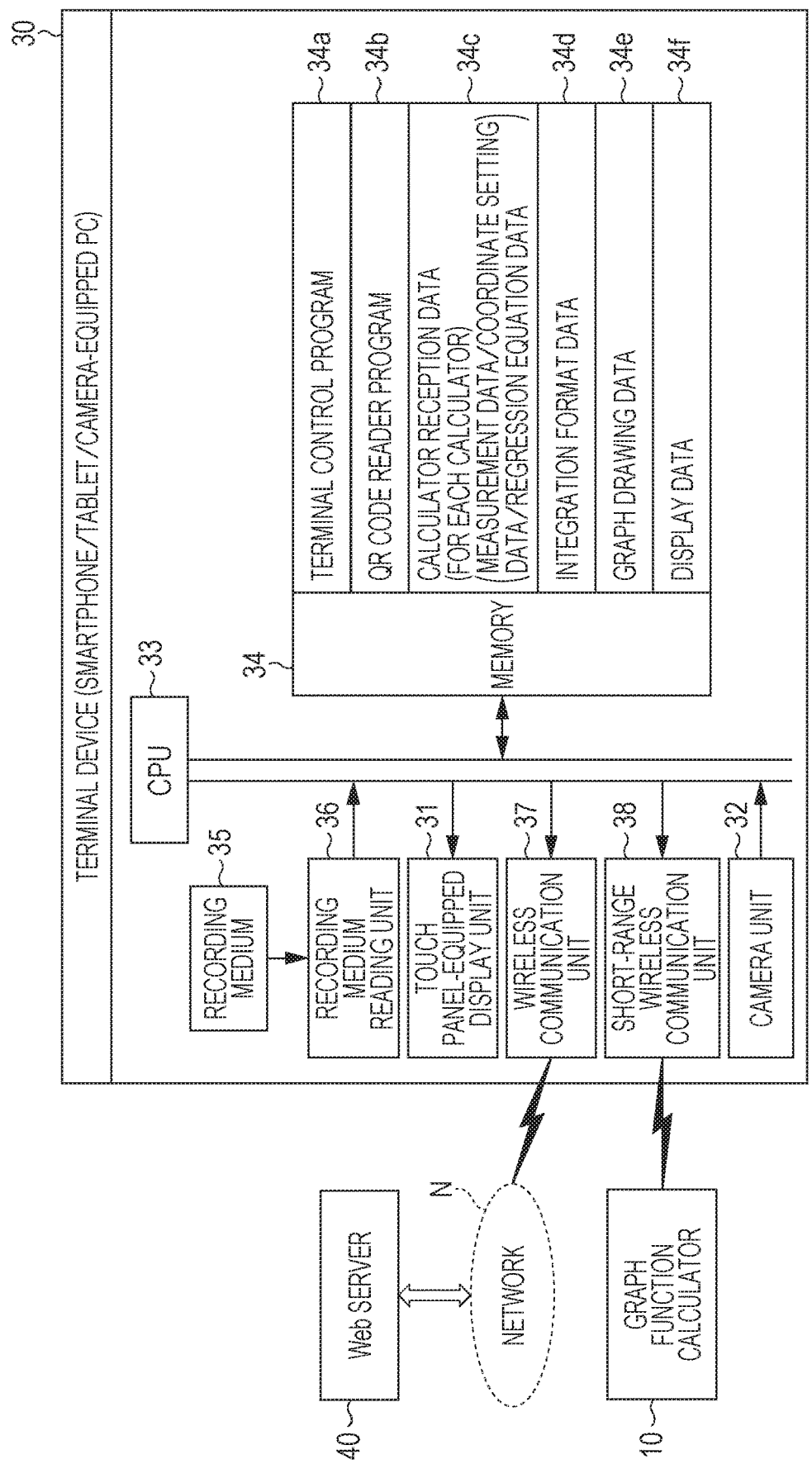
FIG. 6 is a block diagram illustrating a configuration of an electronic circuit of the tablet terminal according to the embodiment of the terminal device of the present invention.

FIG. 6 is a block diagram illustrating a configuration of an electronic circuit of the tablet terminal 30 according to the embodiment of the terminal device of the present invention.

The terminal device can be configured not only as the tablet terminal 30 but also as smartphones, camera-equipped personal computers, mobile phones, touch panel-type personal digital assistants (PDA), electronic books, portable game machines, and the like, which have a communication function with the electronic device (the graph function calculator 10) and a graph drawing function (in which a terminal control program is mounted).

The electronic circuit of the tablet terminal 30 includes not only the touch panel-equipped display unit 31 and the camera unit 32 but also a CPU 33 which is a computer, a memory 34, a recording medium reading unit 36, a wireless communication unit 37, and a short-range wireless communication unit 38.

The CPU 33 controls an operation of each unit of the circuit in accordance with a touch input signal from the touch panel-equipped display unit 31, content of a QR code captured by the camera unit 32, or a reception signal from the wireless communication unit 37 or the short-range wireless communication unit 38 according to a terminal control program 34a and a QR code reader program 34b stored in the memory 34. The respective programs 34a and 34b may be stored in advance in the memory 34, or may be read from the external recording medium 35 such as a memory card via the recording medium reading unit 36 and stored in the memory 34.

The QR code reader program 34b is a general-purpose application program configured to capture a QR code using the camera unit 32 and acquire data of the captured QR code (QR data).

In the memory 34, a calculator reception data area 34c, an integration format data area 34d, a graph drawing data area 34e, a display data area 34f, and a work data area for temporarily storing other work data as necessary are secured.

In the calculator reception data area 34c, each measurement data and graph drawing format data, acquired by being captured using the camera unit 32 as the QR code or acquired by being received using the short-range wireless communication unit 38, from each of the respective graph function calculators 10A, 10B, 10C, and so on are stored and saved for each of the graph function calculators 10A, 10B, 10C, and so on.

The first format data (each setting data of the horizontal axis, the vertical axis, and the coordinates of the display range, and the regression equation data of the regression graph) is stored in the integration format data area 34d among the graph drawing format data specified by being manually or automatically selected from one or the plurality of graph drawing format data stored in the calculator reception data area 34c.

The drawing data of the measurement result graph, generated by plotting each measurement data stored in the calculator reception data area 34c based on the data of the coordinate area (coordinate system) stored in the integration format data area 34d, is stored in the graph drawing data area 34e.

The display data area 34f has a memory area corresponding to a size of a display screen of a liquid crystal display unit constituting the touch panel-equipped display unit 31, and display data that needs to be displayed on the display screen is stored in this memory area as bitmap data.

In the tablet terminal 30 configured in this manner, the CPU 33 controls the operation of each unit of the circuit in accordance with a command described in the terminal control program 34a and the QR code reader program 34b, software and hardware operate in cooperation with each other, thereby executing terminal processing and integrated graph drawing processing which will be described later. As a result, a function of receiving and saving each measurement data and graph drawing format data output from each of the graph function calculators 10A, 10B, 10C, and so on, and a function of drawing the measurement result graph of each measurement data according to the specified graph drawing format data based on the saved measurement data and graph drawing format data as in the description on the operation which will be described later are realized.

Next, the operation of the graph drawing system including the graph function calculator 10 (10A to 10C) and the tablet terminal 30 will be described.

Figure 7:
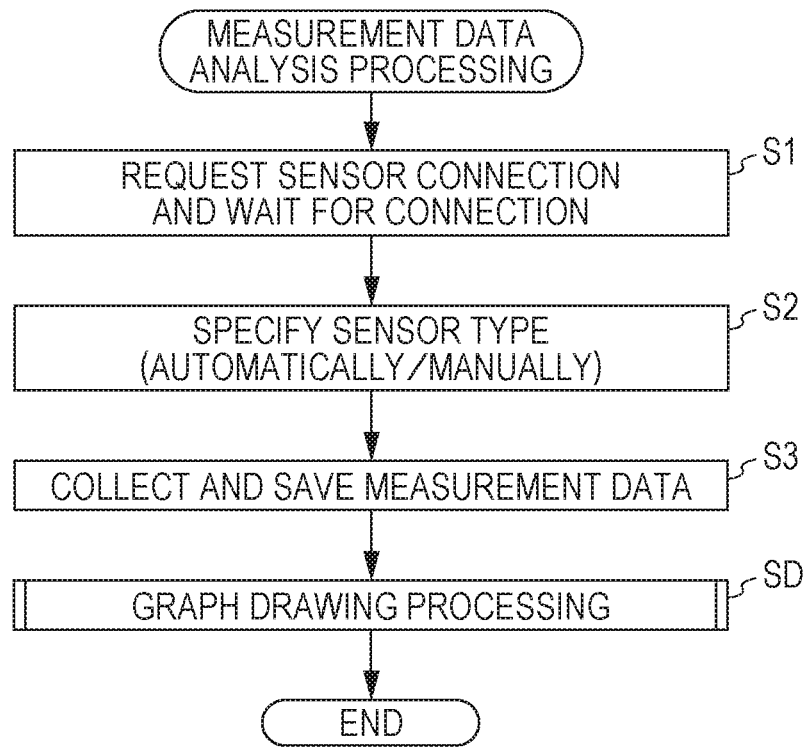
FIG. 7 is a flowchart illustrating measurement data analysis processing of the graph function calculator.

FIG. 7 is a flowchart illustrating the measurement data analysis processing of the graph function calculator 10.

Figure 8:
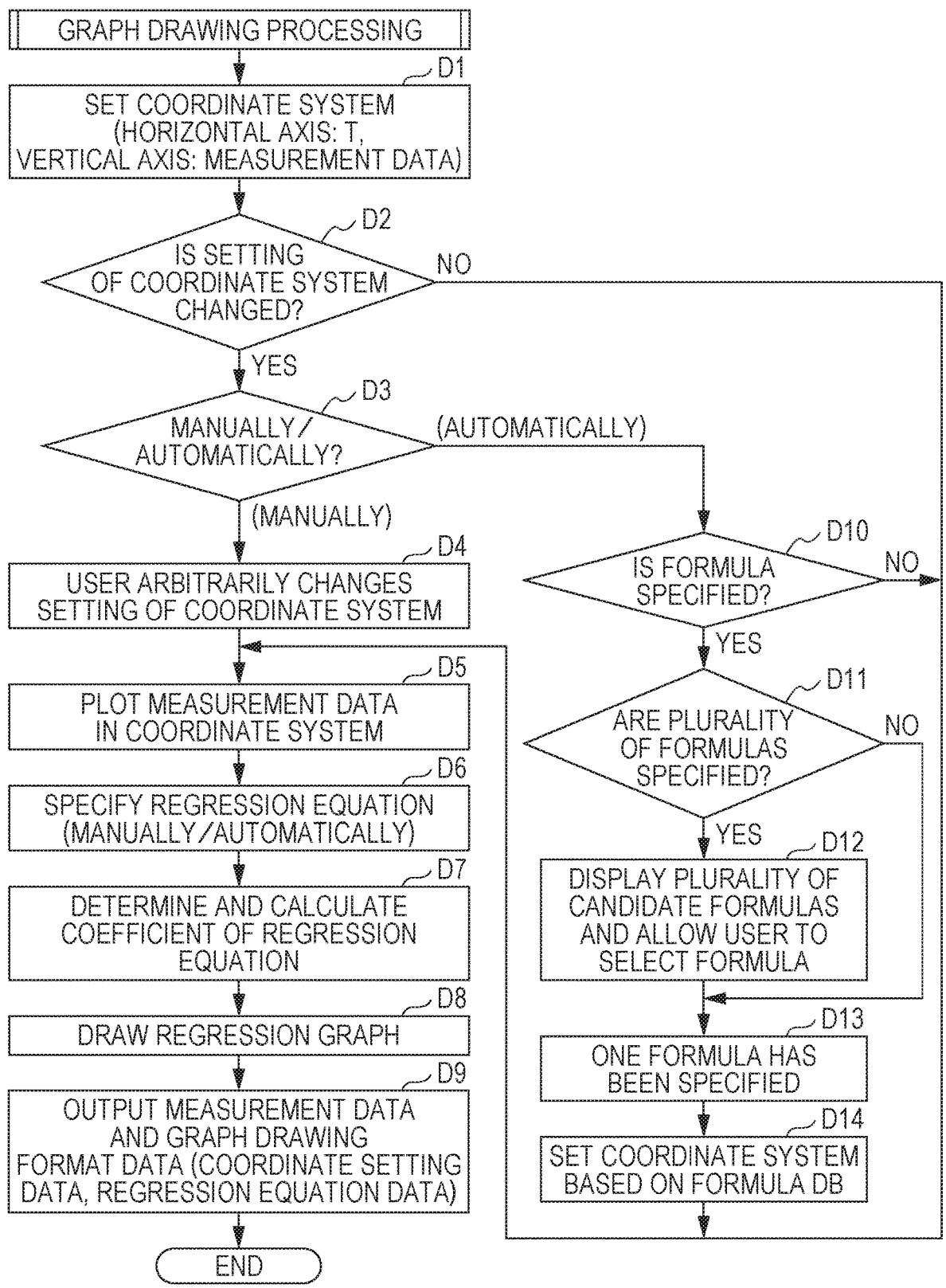
FIG. 8 is a flowchart illustrating graph drawing processing in the measurement data analysis processing of the graph function calculator.

FIG. 8 is a flowchart illustrating the graph drawing processing in the measurement data analysis processing of the graph function calculator 10.

Figure 9:
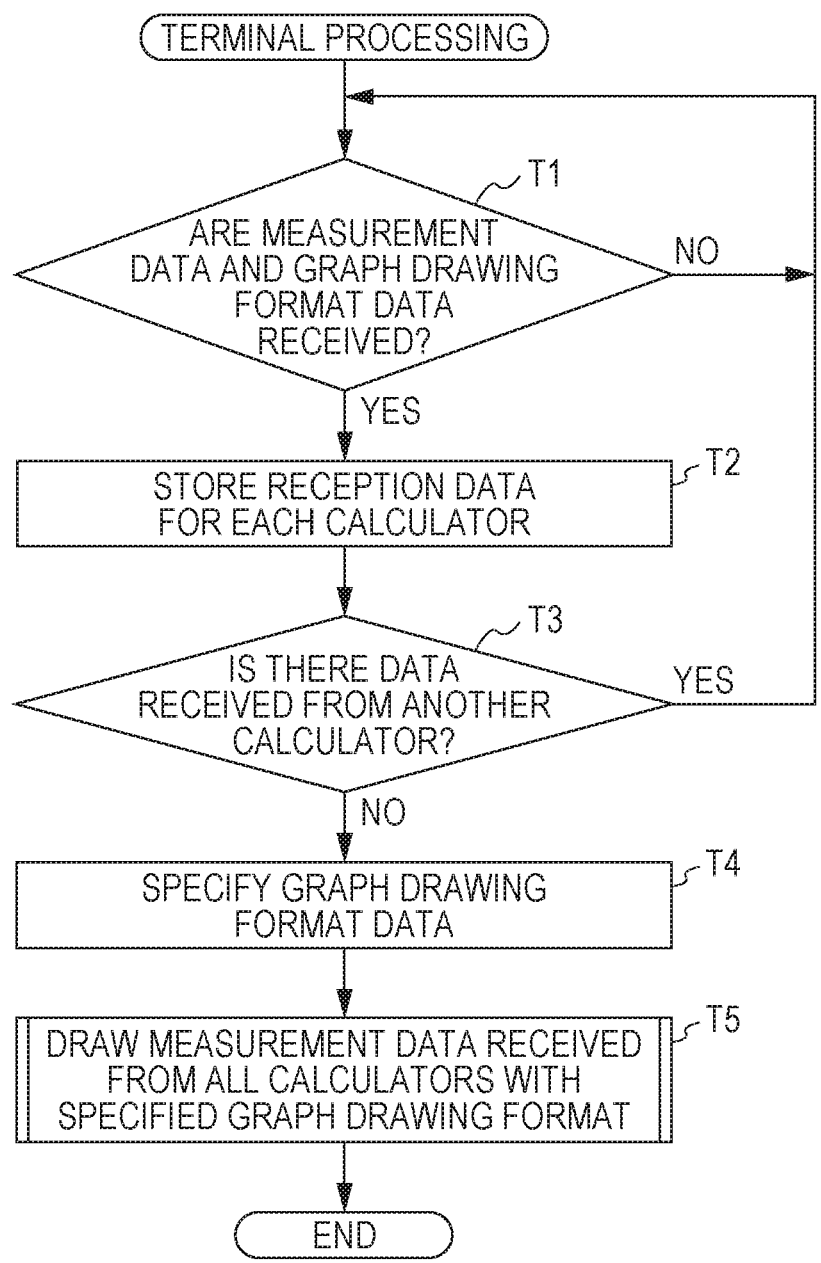
FIG. 9 is a flowchart illustrating terminal processing of the tablet terminal.

FIG. 9 is a flowchart illustrating the terminal processing of the tablet terminal 30.

Figure 10:
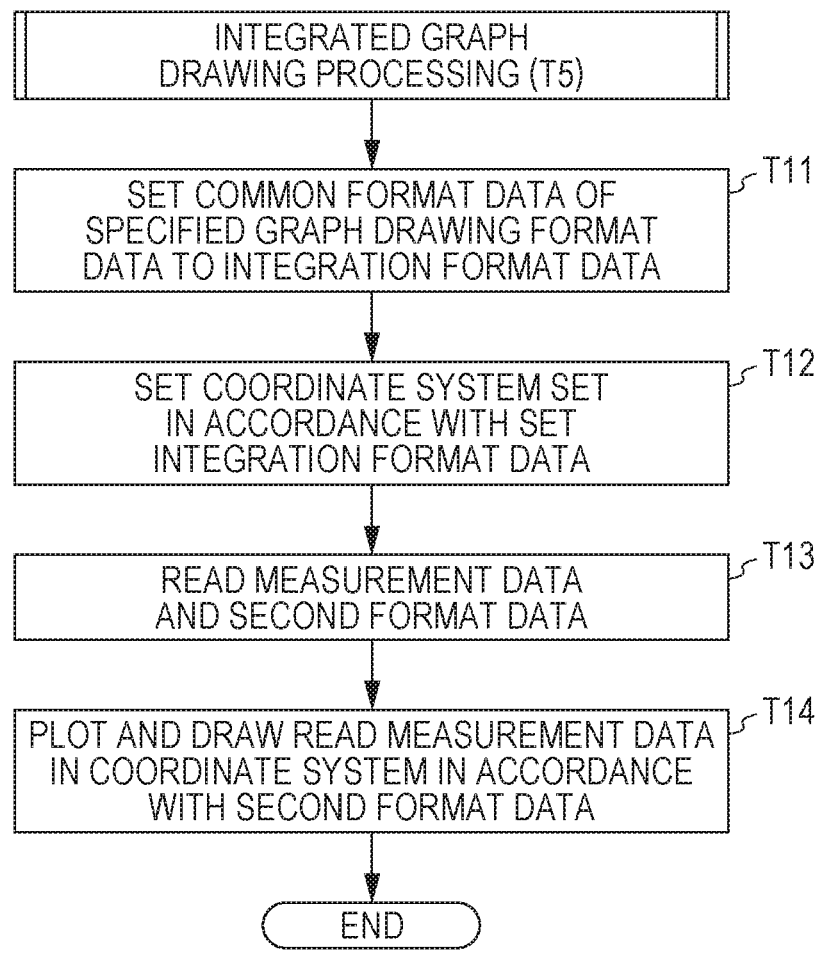
FIG. 10 is a flowchart illustrating integrated graph drawing processing in the terminal processing of the tablet terminal.

FIG. 10 is a flowchart illustrating the integrated graph drawing processing in the terminal processing of the tablet terminal 30.

Figure 11:
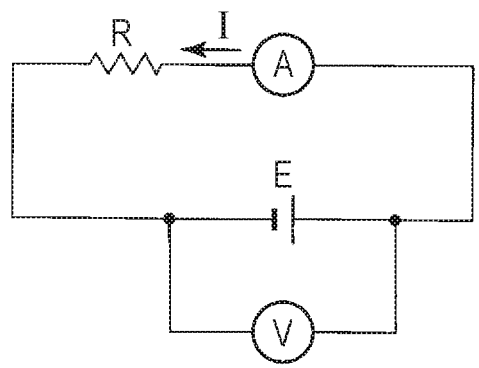
FIG. 11 is a diagram illustrating a DC circuit to be measured according to the embodiment of the measurement data analysis processing of the graph function calculator.

FIG. 11 is a diagram illustrating a DC circuit to be measured according to the embodiment of the measurement data analysis processing of the graph function calculator 10.

In the present embodiment, a description will be given regarding an operation example in which (three) DC circuits, configured such that a DC power supply E is applied to a resistor R as illustrated in FIG. 11, is set as the object to be measured, and a voltage V and a current I flowing through the resistor R at the time of changing the voltage V of the power supply E are measured and analyzed by the graph function calculators 10A, 10B, and 10C of a plurality of students.

When the measurement data analysis processing program 14a is activated by the CPU 13 in response to the user operation of the key input unit 11 in the graph function calculator 10 of a certain student, a message requesting connection of the sensor is displayed on the display unit 12, and a connection standby state is formed (step S1).

Here, when the user connects the current sensor <1> SE1 to the channel CH1 of the data logger 20 connected to the external device I/F 18 and connects the voltage sensor <2> SE2 to the channel CH2, the sensor IDs [0001] and [0002] of the respective sensor <1> SE1 and sensor <2> SE2 are read, and it is automatically specified that a type of the sensor <1> SE1 [ID=0001] is the current sensor and a type of the sensor <2> SE2 [ID=0002] is the voltage sensor according to the sensor database 14b (see FIG. 3)(step S2).

Incidentally, it may be manually specified that the sensor <1> SE1 connected to the channel CH1 of the data logger 20 is the current sensor and the sensor <2> SE2 connected to the channel CH2 is the voltage sensor in response to the user operation of the key input unit 11.

Further, when the start of measurement using the current sensor <1> SE1 and the voltage sensor <2> SE2 is instructed in response to the user operation of the key input unit 11, the current measurement data I (A) measured by the current sensor <1> SE1 and the voltage measurement data V (V) measured by the voltage sensor <2> SE2 are collected in accordance with a sampling period and the number of samples, set in advance or arbitrarily set by the user, and saved in the measurement data area 14e in the memory 14 (step S3).

When the sampling period of the measurement data exceeds a data transfer rate between the external device I/F 18 and the data logger 20, the measurement data I (A) and V (V) are temporarily stored in the measurement data memory 22 in the data logger 20, and then, are collectively collected in the graph function calculator 10 and saved in the measurement data area 14e.

In this manner, when the current measurement data I (A) measured by the current sensor <1> SE1 and the voltage measurement data V (V) measured by the voltage sensor <2> SE2 are collected and saved, the graph drawing processing (see FIG. 8) in accordance with the respective saved measurement data I (A) and V (V) is executed (step SD).

FIGS. 12A1, 12A2, 12B1, 12B2, 12C1, and 12C2 are diagrams illustrating measurement result graphs drawn according to the graph drawing processing in the measurement data analysis processing of the graph function calculators 10A, 10B, and 10C in comparison among the respective calculators 10A to 10C.

Among the graphs, FIGS. 12A1 and 12A2 are graphs illustrating a measurement state of the voltage V and the current I using the graph function calculator 10A of the student A and a state where the linear regression graph re1 is displayed on the measurement result graph Ga plotted with the voltage measurement data V (V) as a horizontal axis and the current measurement data I (A) as a vertical axis. FIGS. 12B1 and 12B2 are graphs illustrating a measurement state of the voltage V and the current I using the graph function calculator 10B of the student B and a state where the quadratic regression graph re2 is displayed on the measurement result graph Gb plotted with the voltage measurement data V (V) as a horizontal axis and the current measurement data I (A) as a vertical axis. FIGS. 12C1 and 12C2 are graphs illustrating a measurement state of the voltage V and the current I using the graph function calculator 10C of the student C and a state where the quadratic regression graph re2 is displayed on the measurement result graph Gc plotted with the time T (s) as a horizontal axis and the multiplied value VI (W) of the measurement data V and I of the voltage and the current as a vertical axis.

When shifting to the graph drawing processing (see FIG. 8), a coordinate system having coordinate axes such that the time T (s) is assigned to the horizontal axis and one or more pieces of measurement data are assigned to the vertical axis is set as a default. At this time, a coordinate range of the horizontal axis of the set coordinate system is automatically set such that the entire time at which the measurement has been performed can be plotted, and one or more coordinate ranges of the vertical axis are automatically set such that at least each maximum value and each minimum value of one or more pieces of measurement data can be plotted. Here, data (first information) for specifying the set coordinate system and the coordinate ranges of the respective axes is stored in the format data area 14d in the memory 14 of each of the graph function calculators 10A, 10B, and 10C as a part of the first format data (step D1).

Then, a message for inquiring of the user about whether to change the setting regarding the coordinate system set as the default is displayed on the display unit 12, and either [Yes] or [No] is selected in response to the user operation (step D2).

Here, if [No] is selected in response to the user operation and the setting is not changed (step D2 (No)), a coordinate area (coordinate system) set based on the coordinate area data as the default in which the time T (s) is assigned to the horizontal axis and one or more pieces of measurement data are assigned to the vertical axis, stored in the format data area 14d, is displayed on the display unit 12, and each measurement data saved in the measurement data area 14e is plotted on the coordinate area, thereby drawing a graph (step D5).

That is, when the current measurement data I (A) is assigned to the vertical axis in response to the user operation among the voltage measurement data V (V) and the current measurement data I (A) saved in the measurement data area 14e in each of the graph function calculators 10A, 10B, and 10C of the students A, B, and C, a graph is drawn by plotting the current measurement data I (A) on the coordinate system having the time T (s) as the horizontal axis and the current I (A) as the vertical axis as illustrated in FIGS. 12A1, 12B1, and 12C1 (step D5).

Although not illustrated, when the voltage measurement data V (V) is assigned to the vertical axis in response to the user operation among the voltage measurement data V (V) and the current measurement data I (A) saved in the measurement data area 14e in each of the graph function calculators 10A, 10B, and 10C, a graph is drawn by plotting the voltage measurement data V (V) on the coordinate system having the time T (s) as the horizontal axis and the voltage V (V) as the vertical axis similarly in the above-described manner (step D5).

On the other hand, if [Yes] is selected in response to the user operation and the setting of the coordinate system set as the default is to be changed in step D2 (step D2 (Yes)), the message [Manually/Automatically] inquiring of the user about whether to manually change the setting by the user or automatically change the setting is displayed on the display unit 12, and either [Manually] or [Automatically] is selected in response to the user operation (step D3).

Here, if [Manually] is selected in response to the user operation and the setting of the coordinate system set as the default is to be manually performed (step D3 (Manually)), a message of inquiring about a type of each value to be assigned to the horizontal axis and the vertical axis is displayed on the display unit 12, and a coordinate system having coordinate axes such that the values of the types instructed by the user are assigned to the horizontal axis and the vertical axis is set in response to the user operation. At this time, the respective values assigned to the horizontal axis and the vertical axis of the set coordinate system are calculated, and a coordinate range of the coordinate system is automatically set such that at least the maximum values and the minimum values of the respective calculated values can be plotted. Here, data (first information) for specifying the set coordinate system and the coordinate ranges of the respective axes is stored in the format data area 14d in the memory 14 of each of the graph function calculators 10A, 10B, and 10C as a part of the first format data (step D4).

Further, the set coordinate area (coordinate system) is displayed on the display unit 12 based on the data of the coordinate area (coordinate system) stored in the format data area 14d, and each measurement data saved in the measurement data area 14e is plotted on the coordinate area, thereby drawing a graph (step D5).

That is, for example, when the voltage measurement data V (V) is assigned to the horizontal axis and the current measurement data I (A) is assigned to the vertical axis in response to the user operation among the voltage measurement data V (V) and the current measurement data I (A) saved in the measurement data area 14e in each of the graph function calculators 10A and 10B of the students A and B (step D4), the measurement result graphs Ga and Gb, drawn by plotting the voltage measurement data V (V) and the current measurement data I (A) as the points P1, P2, and so on with respect to the coordinate system having the voltage V (V) as the horizontal axis and the current I (A) as the vertical axis, are displayed as illustrated in FIGS. 12A2 and 12B2 (step D5).

Further, when the voltage measurement data V (V) and the current measurement data I (A) saved in the measurement data area 14e are set as the objects to be measured and the measurement time T (s) is assigned to the horizontal axis and the multiplied values (power VI (W)) of the voltage V (V) and the current I (A) are assigned to the vertical axis in response to the user operation in the graph function calculator 10C of the student C (step D4), the measurement result graph Gc, drawn by plotting the multiplied values (power VI (W)) of the voltage measurement data V (V) and the current measurement data I (A) as the points P1, P2, and so on with respect to the coordinate system having the time T (s) as the horizontal axis and the power VI (W) as the vertical axis, is displayed as illustrated in FIG. 12C2 (step D5).

Here, since the regression graph corresponding to the measurement result graph Ga is displayed in the graph function calculator 10A of the student A (see FIG. 12A2), the linear regression equation [y=ax+b] is specified in response to the user operation, and the data (first information) specifying the specified regression equation [y=ax+b] is stored in the format data area 14d in the memory 14 of the graph function calculator 10A as a part of the first format data (step D6). Next, a coefficient a, which is an unknown value, is determined based on a regression equation [V=aI+b] obtained by associating each of the measurement data V (V) and I (A) with each element constituting the regression equation [y=ax+b], and a solution (coefficient) a is calculated from the respective measurement data I (A) and V (V) as a value of the resistance R (Ω) (step D7).

Then, the linear regression graph re1 corresponding to the regression equation [V=aI+b] obtained by substituting the value of the coefficient a is drawn and displayed to be superimposed on the same coordinate area as that of the measurement result graph Ga drawn by plotting each of the measurement data I (A) and V (V) as the points P1, P2, and so on as illustrated in FIG. 12A2 (step D8).

Further, since the regression graphs corresponding to the measurement result graphs Gb and Gc are displayed in the graph function calculators 10B and 10C of the students B and C (see FIGS. 12B2 and 12C2), the quadratic regression equation [y=ax$^2$+bx+c] is specified in both the graphs in response to the user operation, and the data (first information) specifying the specified regression equation [y=ax+b] is stored in the format data area 14d in the memory 14 of each of the graph function calculators 10B and 10C as a part of the first format data (step D6). Next, coefficients a and b (=0), which are unknown values, are determined based on a regression equation [VI=aI$^2$+bI+c] obtained by associating each of the measurement data V (V) and I (A) with each element constituting the regression equation [y=ax$^2$+bx+c], and a solution (coefficient) a is calculated from the respective measurement data I (A) and V (V) as a value of the resistance R (Ω) (step D7).

Then, the quadratic regression graph re2 corresponding to the regression equation [VI=aI$^2$+bI+c] obtained by substituting the values of the coefficients a and b is drawn and displayed to be superimposed on the same coordinate area as that of the measurement result graphs Gb and Gc drawn by plotting each of the measurement data I (A) and V (V) as the points P1, P2, and so on as illustrated in FIGS. 12B2 and 12C2 (step D8).

In this manner, the measurement result graphs Ga, Gb, and Gc, drawn by plotting each of the measurement data V (V) and I (A) as the points P1, P2, and so on with respect to the coordinate system set in response to the user operation, are displayed, respectively, in the graph function calculators 10A, 10B, and 10C of the students A, B, and C. Furthermore, a data transmission key (herein, a "QR" key) of the key input unit 11 is operated in order to transfer the data of the graph drawing processing performed by the graph function calculator 10 to the tablet terminal 30 of the teacher in a state where the regression graph re1 or re2 corresponding to the linear or quadratic regression equation specified in response to the user operation is displayed in a superimposed manner (steps D1 to D8).

Then, the voltage measurement data V (V) and the current measurement data I (A) saved in the measurement data area 14e and the graph drawing format data including the setting data of the coordinate area (coordinate system) stored in the format data area 14d and the data of the specified regression equation are converted into the QR code in each of the graph function calculators 10A, 10B, and 10C, and data of the converted QR code is displayed and output onto the display unit 12 (step D9).

FIGS. 13A to 13D are views illustrating the measurement result graphs Gac, Gbc, and Gc drawn with the specified graph drawing format based on each measurement data and graph drawing format data acquired from the plurality of graph function calculators 10A, 10B, and 10C according to the terminal processing of the tablet terminal 30.

When the QR codes displayed on the display units 12 of the respective graph function calculators 10A, 10B, and 10C are captured by the camera unit 32 in the tablet terminal 30 of the teacher for each of the calculators 10A, 10B, and 10C, each data (QR data) of the captured QR codes is acquired according to the QR code reader program 34b (step T1 (Yes)).

Then, the voltage measurement data V (V) and the current measurement data I (A) and the graph drawing format data from each of the graph function calculators 10A, 10B, and 10C included in each of the acquired QR data are stored and saved in the calculator reception data area 34c for each of the calculators 10A, 10B, and 10C (step T2).

When the data from the graph function calculator 10 is transmitted and output via wireless communication or wired communication and is received and acquired by the tablet terminal 30 via wireless communication or wired communication, the voltage measurement data V (V) and the current measurement data I (A) from the calculator 10 and the graph drawing format data, included as the reception data, are stored and saved in the calculator reception data area 34c (steps T1 and T2).

Further, when the data (measurement data and graph drawing format data) is acquired from all the graph function calculators 10A, 10B, and 10C and saved (step T3 (No)), graph drawing format data to be used at the time of drawing an integrated graph is then specified in response to the user operation. At this time, a message that prompts the user to specify the graph drawing format data of any of the calculators 10A, 10B, and 10C is displayed on the touch panel-equipped display unit 31.

Here, when the graph drawing format data acquired from the graph function calculator 10C of the student C, for example, is selected and specified in response to the user operation (step T4), the integrated graph drawing processing illustrated in FIG. 10 is executed (step T5).

In the integrated graph drawing processing, first, the first format data out of the graph drawing format data specified in the above-described step T4 is stored in the integration format data area 34d of the memory 34 (step T11). More specifically, the first format data of the graph function calculator 10C, that is, the data (see FIG. 5B) in which the horizontal axis is "Time T (s)", the vertical axis is "Power P (W)", the coordinates of the display range are "Xcmin, Xcmax, Ycmin, Ycmax", and the regression equation data of the regression graph is "Quadratic Equation ($y=ax^2+bx+c$)" is stored as integration format data in the integration format data area 34d.

Next, the integration format data stored in the above-described step T11 is read from the integration format data area 34d, and a coordinate area (coordinate system) is set based on this read data (step T12). More specifically, the coordinate area, stored in the integration format data area 34d, in which the time T (s) is assigned to the horizontal axis, the power P (W) is assigned to the vertical axis, and the coordinates of the display range are "Xcmin, Xcmax, Ycmin, Ycmax" is set, and "Quadratic Equation ($y=ax^2+bx+c$)" is set as the regression equation data of the regression graph.

Next, the voltage measurement data V (V) and the current measurement data I (A) of each of the graph function calculators 10A, 10B, and 10C, and the second format data (the setting data of the display mode of the plotted point and the display mode of the plotted line) out of the graph drawing format data of each of the graph function calculators 10A, 10B, and 10C, among the data received in the above-described steps T1 and T2, are read from the calculator reception data area 34c of the memory 34 (step T13).

Next, the coordinate area (coordinate system) set in the above-described step T12 is displayed on the touch panel-equipped display unit 31, and the voltage measurement data V (V) and the current measurement data I (A) of each of the graph function calculators 10A, 10B, and 10C read from the calculator reception data area 34c in the above-described step T13, and the regression graph using the quadratic equation ($y=ax^2+bx+c$) are plotted and drawn in the above-described coordinate area according to the display mode based on each corresponding second format data (step T14).

According to the above-described integrated graph drawing processing, four graphs in total of the three measurement result graphs Gac, Gbc, and Gc as illustrated in FIGS. 13A, 13B, and 13C, which correspond to the graph function calculators 10A, 10B, and 10C, respectively, and one measurement result integrated graph Gabc, obtained by plotting the measurement data of all the graph function calculators 10A, 10B, and 10C in one coordinate region, are drawn on the touch panel-equipped display unit 31 of the tablet terminal 30.

At this time, each graph corresponding to the graph function calculators 10A, 10B, and 10C is drawn in each coordinate area according to each of the display modes based on the second format data unique to each graph function calculator, and thus, a correspondence between each of the graph function calculators 10A, 10B, and 10C and each of the measurement result graphs Gac, Gbc, and Gc is easily understood when the display modes are different from each other. Further, when three plots corresponding to the graph function calculators 10A, 10B, and 10C, respectively, are drawn in one coordinate area as in the measurement result integrated graph Gabc, it is easy to understand particularly a correspondence between each of the graph function calculators 10A, 10B, and 10C and each of the measurement result plots. When display modes of two or more graph function calculators are the same, at least any one of the second format data stored in the calculator reception data area 34c may be automatically changed so that the display modes of all the graphs can be set to be different from each other.

Although only the first format data out of the specified graph drawing format data is stored in the integration format data area 34d of the memory 34 in the above-described step T11, the invention is not limited thereto. As a modified example, it may be configured such that the second format data out of the specified graph drawing format data is also stored as integration format data in the integration format data area 34d in addition to the first format data (step T11'). Next, the first format data out of the integration format data is read from the integration format data area 34d, and a coordinate area (coordinate system) is set based on this read data (step T12'). Next, only the voltage measurement data V (V) and the current measurement data I (A) of each of the graph function calculators 10A, 10B, and 10C are read from the calculator reception data area 34c of the memory 34 (step T13'). Next, the coordinate area (coordinate system) set in the above-described step T12 is displayed on the touch panel-equipped display unit 31, and the voltage measurement data V (V) and the current measurement data I (A) of each of the graph function calculators 10A, 10B, and 10C read from the calculator reception data area 34c in the above-described step T13, and the regression graph using the quadratic equation ($y=ax^2+bx+c$) are plotted and drawn in the above-described coordinate area according to the display mode based on the second format data (that is, the second format data of the graph function calculator 10C) out of the specified graph drawing format data (step T14'). According to such integrated graph drawing processing of this modification example, at least a graph, obtained by plotting the measurement data of all of the graph function calculators 10A, 10B, and 10C in one coordinate area, which is the same setting content as that of the graph function calculator 10C, with the display mode based on the second format data of the graph function calculator 10C is drawn as a measurement result integrated graph Gabc' on the touch panel-equipped display unit 31 of the tablet terminal 30.

Incidentally, it may be configured such that the graph drawing format data of the calculator 10 acquired for the first time among the graph function calculators 10A to 10C is automatically specified, for example, instead of selecting and specifying any graph drawing format data to be specified among the respective pieces of graph drawing format data acquired from the plurality of graph function calculators 10A to 10C in response to the user operation as described above.

Then, the measurement result graphs Gac, Gbc, and Gc, drawn by plotting the multiplied values (power VI (W)) of the measurement data V (V) and I (A) of each of the graph function calculators 10A, 10B, and 10C stored in the calculator reception data area 34c as the points P1, P2, and so on with respect to each of the three same coordinate areas, displayed on the touch panel-equipped display unit 31, each of which has the time T (s) as the horizontal axis and the multiplied value VI (W) of the voltage and the current as the vertical axis, are displayed. Further, the quadratic regression graph re2 corresponding to the quadratic regression expression included in the specified graph drawing format data is drawn and displayed to be superimposed on the same coordinate area as those of the respective measurement result graphs Gac, Gbc, and Gc (step T5).

Incidentally, display in which the measurement result graphs Gac, Gbc, and Gc illustrated in FIGS. 13A, 13B, and 13C are arranged side by side and display in which the measurement result graphs Gac, Gbc, and Gc are collected as the single measurement result integrated graph Gabc as illustrated in FIG. 13D are switched in response to a display mode switching instruction on whether to display the measurement result graphs of the graph function calculators 10A, 10B, and 10C to be arranged side by side or collectively in response to the user operation.

As a result, the plurality of students A, B, and C use the graph function calculators 10A, 10B, and 10C to plot and draw the voltage measurement data V (V) and the current measurement data I (A) in the coordinate area of the graph drawing format set by each of the calculators 10A, 10B, and 10C and display the measurement result graphs Ga, Gb, and Gc (see FIGS. 12A2, 12B2, and 12C2), and then, can display the measurement result graphs Gac, Gbc, and Gc (see FIGS. 13A to 13C) of the measurement data V (V) and I (A) collected by each of the calculators 10A, 10B, and 10C to be unified in any one coordinate area among the coordinate areas set by the respective calculators 10A, 10B, and 10C with a simple user operation.

Thus, for example, when a graph drawing format set by the calculator 10 of a certain student is suitable for learning analysis of certain measurement data, it is possible to display a measurement result graphs of all the measurement data to be easily unified in a coordinate area of the suitable graph drawing format.

Each example of the graph drawing processing performed by manually setting the graph drawing format including the coordinate area in the plurality of graph function calculators 10A, 10B, and 10C and the terminal processing of the tablet terminal 30 has been described as above. Next, a graph drawing processing that is performed by automatically setting a graph drawing format including a coordinate area in the graph function calculators 10A, 10B, and 10C will be described.

When [Automatically] is selected in response to the user operation in step D3 in the graph drawing processing of each of the graph function calculators 10A, 10B, and 10C and the setting of the coordinate system set as the default is automatically changed (step D3 (Automatically)), a formula including elements of an equation corresponding to types of connected sensors (sensor <1> SE1: current sensor, sensor <2> SE2: voltage sensor) specified in the above-described step S2 is specified in accordance with the formula database 14c (see FIG. 4) in the memory 14. More specifically, it is specified that there are two formulas of [V=RI] and [W=VI=RI$^2$] as the formula including at least any of the current I and the voltage V as the element in the column of the sensor type in the formula database 14c (step D10: Yes, step D11: Yes).

Next, a message that prompts selection of one of the two formulas is displayed on the display unit 12, and any one of the formulas is selected in response to the user operation (step D12). Here, a case where the formula [V=RI] is selected and specified by the user will be described (step D13).

When it is specified that there are the plurality of formulas corresponding to the type of the sensor in the middle of being connected in this manner, a formula is specified as any one of the formulas is selected in response to the user operation. Incidentally, a description will be given later regarding a case where it is specified that there is only one formula corresponding to a type of a sensor in the middle of being connected or a case where it is specified that there is no formula corresponding to a type of a sensor in the middle of being connected.

When the formula is specified in step D13 by the above-described processing, a coordinate system having coordinate axes such that the specified formula has been assigned to at least any of a horizontal axis and a vertical axis is set (step D14). In the present embodiment, whether any of a term corresponding to measured data, a term corresponding to a time (elapsed time from a reference time) when the data has been measured, and a term corresponding to a calculated value of at least any of the term corresponding to the measured data and the term corresponding to the time (elapsed time from the reference time) when the data has been measured is included in a part of the specified formula is determined, and the included terms are automatically assigned to the horizontal and vertical axes if the terms are included. In this manner, coordinate values that need to be plotted in the coordinate system determined in step D14 are known at the time when the measurement data has been obtained, and thus, it is possible to generate a graph uniquely using the measurement data conforming to the specified formula.

Further, it is preferable to assign the right-hand side of the formula to correspond to the horizontal axis and assign the left-hand side thereof to correspond to the vertical axis. It is because it is possible to consider that it becomes easier to grasp a correspondence between a formula and a graph with the above-described manner, and a learning effect can be enhanced. Conversely, the right-hand side may correspond to the vertical axis and the left-hand side may correspond to the horizontal axis since it is sufficient if the graph is suitable for a purpose of learning.

The processing performed in step D14 will be specifically described. When the formula [V=RI] is specified in the above-described step D13, it is determined that the current I (A), which is measured data, is included in the right-hand side of the formula, and the voltage V (V), which is measured data, is included in the left-hand side of the formula. Therefore, a coordinate system in which the current I (A) is assigned to the horizontal axis by causing the right-hand side to correspond to the horizontal axis and the voltage V (V) is assigned to the vertical axis by causing the left-hand side to correspond to the vertical side is automatically set in this case. Each coordinate range of the horizontal axis and the vertical axis of the set coordinate system is automatically set such that at least the maximum value and the minimum value of the current I (A) and the voltage V (V) of each measurement data can be plotted. More specifically, coordinate region (coordinate system) data having a horizontal axis of Imin to Imax (A) and a vertical axis of Vmin to Vmax (V) is set in accordance with the specified formula [V=RI] and values of the measurement data I (A) and V (V) stored in the measurement data area 14e and stored in the format data area 14d in the memory 14.

Further, a coordinate area (coordinate system) in which a horizontal axis is I (A) and a vertical axis is V (V) is displayed on the display unit 12 (the coordinate area in which objects to be set of measurement data with respect to the horizontal axis and the vertical axis illustrated in FIG. 12A2 are reversed although not illustrated) based on the coordinate area data stored in the format data area 14d, and a graph is drawn by plotting each of the measurement data I (A) and V (V) stored in the measurement data area 14e on the coordinate area as points P1, P2, and so on. Further, the specified formula [V=RI] is displayed (step D5).

When the coordinate area corresponding to the formula [V=RI] including each measurement data as the equation element is automatically set and the measurement result graph is drawn and displayed regarding each of the measurement data I (A) and V (V) obtained by the current sensor <1> SE1 and the voltage sensor <2> SE2 in this manner, a regression equation [y=ax+b] corresponding to the formula [V=RI] specified in the above-described step D13 is specified by the CPU 13 in accordance with the formula database 14c (see FIG. 4) in the memory 14 (step D6).

Then, a coefficient a, which is an unknown value, is determined based on a regression equation [V=aI+b] obtained by associating the respective elements constituting the above-described formula [V=RI] with the respective elements constituting the regression equation [y=ax +b], and the solution (coefficient) a is calculated from the respective measurement data I (A) and V (V) as a value of the resistance R (Ω) (step D7).

Then, the regression graph re1 corresponding to the regression equation [V=aI+b] obtained by substituting the value of the coefficient a is drawn to be superimposed on the same coordinate area as that of the measurement result graphs obtained by plotting each of the measurement data I (A) and V (V) as the points P1, P2, and so on to correspond to the formula [V=RI] (the measurement result graph in which the objects to be set of the measurement data with respect to the horizontal axis and the vertical axis illustrated in FIG. 12A2 are reversed although not illustrated), and this regression equation [V=aI+b] and the solution a (=R) thereof are displayed together (step D8).

The measurement result graph (see FIGS. 12A1, 12A2, 12B1, 12B2, 12C1, and 12C2) is drawn by collecting and saving each of the measurement data I (A) and V (V) in the measurement data area 14e, and then, plotting each of the saved measurement data I (A) and V (V) as the points P1, P2, and so on, but may be drawn by plotting each of the measurement data I (A) and V (V) as the points P1, P2, and so on every time each of the measurement data I (A) and V (V) from each of the sensor <1> SE1 and the sensor <2> SE2 is input via the data logger 20 and the external device I/F 18.

Here, when the data transmission key (here, the "QR" key) of the key input unit 11 is operated in order to transfer the data of the graph drawing processing, which has been performed by automatically setting the coordinate area by the graph function calculator 10, to the tablet terminal 30 of the teacher, the voltage measurement data V (V) and the current measurement data I (A) saved in the measurement data area 14e and the graph drawing format data including the setting data of the coordinate area (coordinate system) stored in the format data area 14d and the data of the specified regression equation are converted into the QR code similarly as described above, and data of the converted QR code is displayed and output onto the display unit 12 (step D9).

Since the subsequent terminal processing (see FIGS. 9 and 13) in the tablet terminal 30 is the same as that in the case of transferring the data of the graph drawing processing performed by manually setting the coordinate area by the graph function calculator 10, the description thereof will be omitted. That is, for example, when a graph drawing format set by the calculator 10 of a certain student is suitable for learning analysis of certain measurement data, it is possible to display a measurement result graphs of all the measurement data to be easily unified in a coordinate area of the suitable graph drawing format.

Next, a description will be given regarding a case where it is specified in the graph function calculator 10 that there is the only one formula corresponding to a type of a sensor in the middle of being connected. In this case, the above-described user operation of selecting a formula, which is performed when there are the plurality of corresponding formulas, can be omitted. For example, it is assumed that the only one formula corresponding to a distance sensor is stored in the formula database 14c as illustrated in the third row of FIG. 4. In addition, when only the distance sensor is connected to the data logger 20, it is specified that there is the only one formula $[L=L_0+V_0T+(1/2)aT^2]$ corresponding to the distance sensor in the formula database 14c, and accordingly, the formula may be specified automatically without depending on the user operation (step D10: Yes, step D11: No, step D13).

When the formula $[L=L_0+V_0T+(1/2)aT^2]$ is specified in step D13 by the above-described processing, whether any of a term corresponding to measured data, a term corresponding to a time (elapsed time from a reference time) when the data has been measured, and a term corresponding to a calculated value of at least any of the term corresponding to the measured data and the term corresponding to the time (elapsed time from the reference time) when the data has been measured is included in a part of the specified formula is determined. In the above-described formula $[L=L_0+V_0T+(1/2)aT^2]$, the measured data is the distance L (m), and thus, [L] of the left-hand side of the formula corresponds to the "term corresponding to measured data", and the time T (s) corresponds to the "term corresponding to a time (elapsed time from a reference time) when the data has been measured". Therefore, a coordinate system in which the time T (s) is assigned to a horizontal axis and the distance L (m) is assigned to a vertical axis is automatically set based on the formula $[L=L_0+V_0T+(1/2)aT^2]$. Incidentally, $[L_0]$, $[V_0]$, and [a] in the right-hand side of the formula are unknown at the time when measurement data has been obtained, and thus, it is difficult to determine a coordinate value for graph drawing if the terms including these values are assigned to the axis. Therefore, $[L_0]$, $[V_0]$, [a] and at least any calculated value thereof are not assigned to the horizontal axis or the vertical axis.

Next, a coordinate range of the horizontal axis of the set coordinate system is automatically set such that at least the maximum value and the minimum value of the time T (s) can be plotted, a coordinate range of the vertical axis is automatically set such that at least the maximum value and the minimum value of the distance L (m) can be plotted, and these coordinate ranges are stored in the format data area 14d in the memory 14 (step D14).

Further, a coordinate area (coordinate system) in which the horizontal axis is the time T (s) and the vertical axis is the distance L (m) is displayed on the display unit 12 based on the coordinate area data stored in the format data area 14d, and each measurement data and the calculated values saved in the measurement data area 14e are plotted on the coordinate area, thereby drawing a graph. Further, the specified formula $[=L_0+V_0T+(1/2)aT^2]$ is displayed (step D5).

The processing after the graph has been drawn in step D5 by the above-described processing is the same as that in the above-described embodiment, and thus, the description thereof will be omitted.

Next, a description will be given regarding a case where any formula including an equation element corresponding to a type of a sensor in the middle of being connected, which has been specified in the above-described step S2, is not specified in step D10 of the graph drawing processing illustrated in FIG. 8.

When any formula including the equation element corresponding to the type of the sensor in the middle of being connected is not found in the formula database 14c in the above-described step D10, that is, when no formula is specified, the process proceeds to step D5.

In this case, a coordinate area (coordinate system) set based on the coordinate area data as the default in which the time T (s) is assigned to the horizontal axis and one or more pieces of measurement data are assigned to the vertical axis, stored in the format data area 14d in the above-described step D1, is displayed on the display unit 12, and each measurement data saved in the measurement data area 14e is plotted on the coordinate area, thereby drawing a graph (step D5).

Each example of the graph drawing processing performed by automatically setting the graph drawing format including the coordinate area in each of the graph function calculators 10A, 10B, and 10C and the terminal processing of the tablet terminal 30 has been described as above. When no formula is specified, a regression equation is also unknown, and thus, the process of outputting the measurement data and the graph drawing format data (step D9) is executed without executing each process in the above-described steps D6 to D8, and the graph drawing processing is ended.

Therefore, according to the graph drawing system having the above-described configuration, when the measurement data V (V) and I (A) of the voltage V and the current I are collected, for example, in the graph function calculators 10A, 10B, and 10C, the coordinate area (coordinate system) in which the term corresponding to the measured data, the term corresponding to the time (elapsed time from the reference time) when the data has been measured, and the term corresponding to the calculated value of at least any of the term corresponding to the measured data and the term corresponding to the time (elapsed time from the reference time) when the data has been measured are manually or automatically assigned to the horizontal axis and the vertical axis is set, and the measurement result graphs Ga, Gb, and Gc drawn by plotting the measurement data in the set coordinate area are displayed on the display unit 12. Further, the regression graph re1 or re2 corresponding to the regression equation that has been manually or automatically specified is displayed to be superimposed on the coordinate areas of the respective measurement result graphs Ga, Gb, and Gc. Further, each measurement data collected by each of the graph function calculators 10A, 10B, and 10C, and the graph drawing format data including the setting data of the coordinate areas of the respective measurement result graphs Ga, Gb, and Gc and the data of the regression equations are converted into the QR code, an ultrasonic signal, a wireless signal, a wired signal, or the like for each of the calculators 10A, 10B, and 10C and the converted result is output and transferred to and acquired by the tablet terminal 30.

When each measurement data and each graph drawing format data output from the plurality of graph function calculators 10A, 10B, and 10C are acquired in the tablet terminal 30, the coordinate area corresponding to any graph drawing format data manually or automatically specified out of the respective graph drawing format data is displayed on the touch panel-equipped display unit 31, and the measurement data acquired from each of the calculators 10A to 10C is plotted and drawn in the specified coordinate area.

As a result, for example, when a graph drawing format set by the calculator 10 of a certain student is suitable for learning analysis of certain measurement data, it is possible to display a measurement result graphs of all the measurement data to be easily unified in a coordinate area of the suitable graph drawing format.

Accordingly, it is possible to simplify the user operation, which is complicated in the related art, at the time of drawing a different graph with the same format as the graph format that has been used by the certain student to draw the graph using different data measured by another student.

The above-described embodiment is configured such that any graph drawing format data is specified among the respective pieces of graph drawing format data acquired by the tablet terminal 30 of the teacher from the graph function calculators 10A to 10C of the respective students A, B and C, and the measurement result graph of each measurement data acquired from the respective calculators 10A to 10C is drawn to be unified in the coordinate area (coordinate system) according to the specified graph drawing format data. However, it may be configured such that, for example, the graph drawing format data acquired from the graph function calculator 10C of the certain student C is transmitted to the graph function calculators 10A and 10B of all the other students A and B, a coordinate area according to the graph drawing format data unified among the graph function calculators 10A to 10C of all the students A, B and C is set, and a measurement result graph is drawn by plotting the measurement data of the respective calculators 10A to 10C as will be described in the following other embodiments.

Other Embodiments

Figure 14:
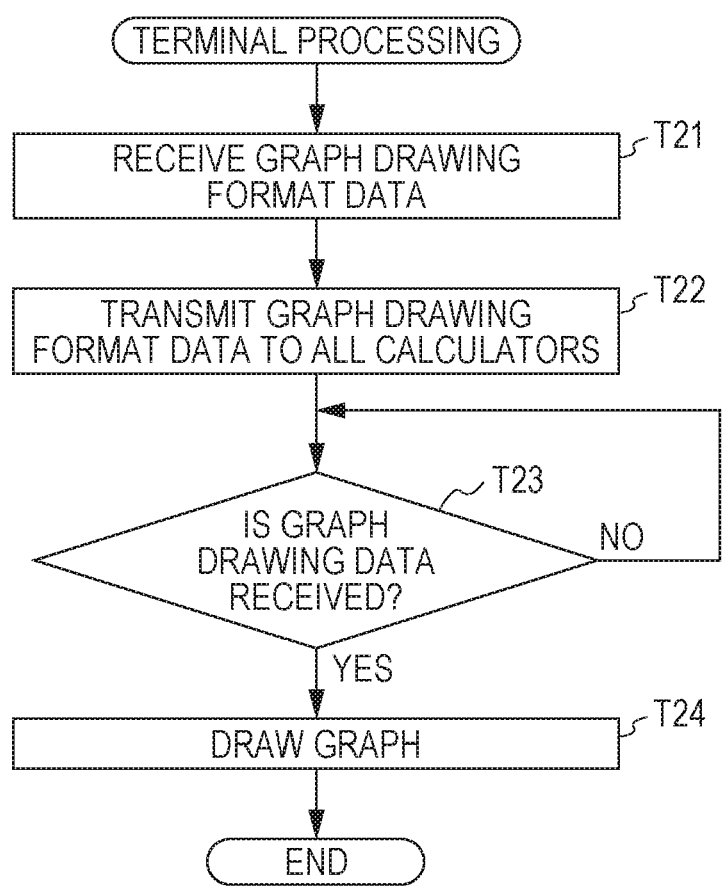
FIG. 14 is a flowchart illustrating terminal processing according to another embodiment of the tablet terminal.

FIG. 14 is a flowchart illustrating terminal processing according to another embodiment of the tablet terminal 30.

Figure 15:
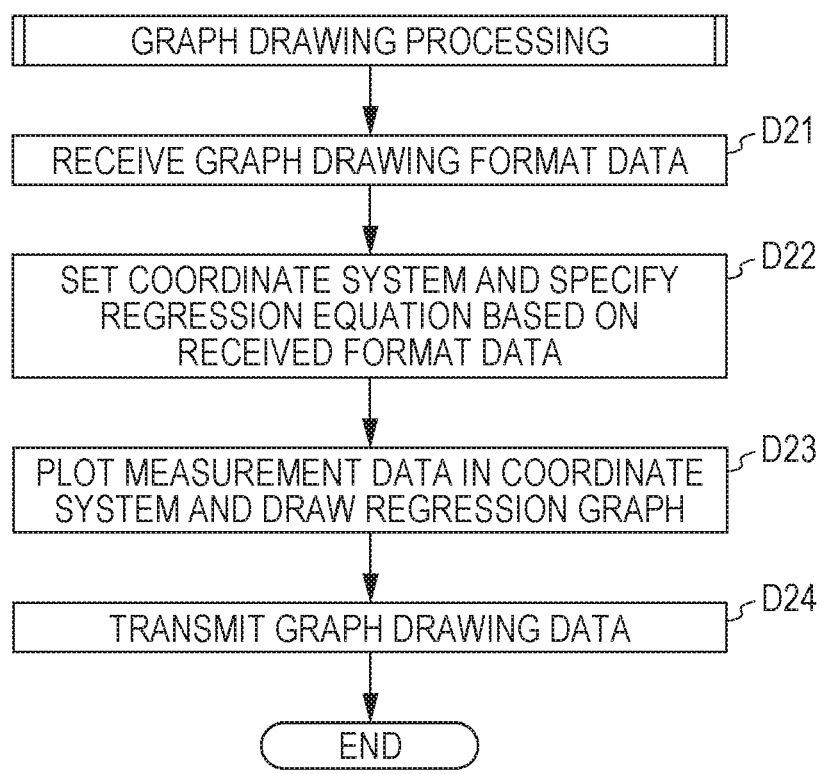
FIG. 15 is a flowchart illustrating graph drawing processing according to another embodiment of the graph function calculator.

FIG. 15 is a flowchart illustrating graph drawing processing according to another embodiment of the graph function calculator 10.

For example, as illustrated in FIGS. 12A2, 12B2, and 12C2, the measurement result graph Ga in which each of the measurement data V (V) and I (A) is plotted as the points P1, P2, and so on and the linear regression graph re1 is drawn is displayed in the coordinate area where the voltage V (V) and the current I (A) are assigned to the horizontal axis and the vertical axis, respectively, in the graph function calculator 10A of the student A. In the graph function calculator 10B of the student B, the measurement result graph Gb in which each of the measurement data V (V) and I (A) is plotted as the points P1, P2, and so on and the quadratic regression graph re2 is drawn is displayed in the coordinate area where the voltage V (V) and the current I (A) are assigned to the horizontal axis and the vertical axis, respectively. In the graph function calculator 10C of the student C, the measurement result graph Gc in which the measurement data VI (W) is plotted as the points P1, P2, and so on and the quadratic regression graph re2 is drawn is displayed in the coordinate area where the time T (s) and the multiplied value VI (W) of the voltage V (V) and the current I (A) are assigned to the horizontal axis and the vertical axis, respectively. In this state, the graph drawing format data (including the coordinate setting data of the horizontal axis, the vertical axis, and the display range/the display modes (the type, the color, and the size/thickness) of the plotted point and line/the regression equation data of the regression graph and the like) received by the tablet terminal 30 of the teacher from the graph function calculator 10C of the student C via wireless communication or the like is transmitted and output to the graph function calculators 10A and 10B of all the other students A and B via wireless communication or the like (steps T21 and T22).

When the graph drawing format data set by the graph function calculator 10C of the student C transmitted from the tablet terminal 30 of the teacher is received in the graph function calculators 10A and 10B of the students A and B (step D21), setting content of the coordinate area and the regression equation included in the format data are specified based on the received graph drawing format data (step D22).

Then, each of the measurement result graphs Gac and Gbc (see FIGS. 13A and 13B) in which the measurement data VI (W) collected by each of the calculators 10A and 10B is plotted as points P1, P2, and so on and the quadratic regression graph re2 is drawn is displayed in the coordinate area where the time T (s) and the multiplied value VI (W) of the voltage V (V) and the current I (A) are assigned to the horizontal axis and the vertical axis, respectively, even in the graph function calculators 10A and 10B of the students A and B, which is similar to the graph function calculator 10C of the student C (step D23).

Thereafter, the graph drawing data of the respective measurement result graphs Gac, Gbc, and Gc, drawn in the coordinate area (the horizontal axis T (s), the vertical axis VI (W)) according to the graph drawing format data unified among the graph function calculators 10A to 10C of the respective students A, B and C, is transmitted to the tablet terminal 30 of the teacher (step D24).

Then, the respective measurement result graphs Gac, Gbc, and Gc, which are the same as those displayed in the coordinate area unified among the respective calculators 10A to 10C according to the graph drawing data received from the graph function calculators 10A to 10C of the students A, B and C, are drawn and displayed on the touch panel-equipped display unit 31 in the tablet terminal 30 of the teacher as illustrated in the above-described FIGS. 13A to 13C (steps T23 and T24).

In this manner, even in the other embodiments, it is possible to display the measurement result graphs Gac, Gbc, and Gc of the measurement data V (V) and I (A) collected by the respective calculators 10A, 10B, and 10C to be unified in any coordinate area among the coordinate areas set by the respective calculators 10A, 10B, and 10C with a simple user operation, which is similar to the above-described embodiment.

Accordingly, for example, when a graph drawing format set by the calculator 10 of a certain student is suitable for learning analysis of certain measurement data, it is possible to display a measurement result graphs of all the measurement data to be easily unified in a coordinate area of the suitable graph drawing format.

Incidentally, the graph drawing system of each of the above-described embodiments is configured such that the measurement result graphs Gac, Gbc, and Gc of the measurement data collected by the respective calculators 10A to 10C can be displayed, in the tablet terminal 30 of the teacher, to be unified in any coordinate area among the coordinate areas set by the respective calculators 10A to 10C with the simple user operation by plotting and drawing the respective pieces of measurement data acquired, respectively, by all the calculators 10A to 10C in the coordinate area according to the graph drawing format data acquired from the graph function calculator 10C of the certain student C or by transmitting the graph drawing format data acquired from the graph function calculator 10C of the certain student C to the respective graph function calculators 10A and 10B of the other students A and B and plotting and drawing each of the corresponding measurement data in the coordinate area according to the same graph drawing format data in all the calculators 10A to 10C.

Figure 16:
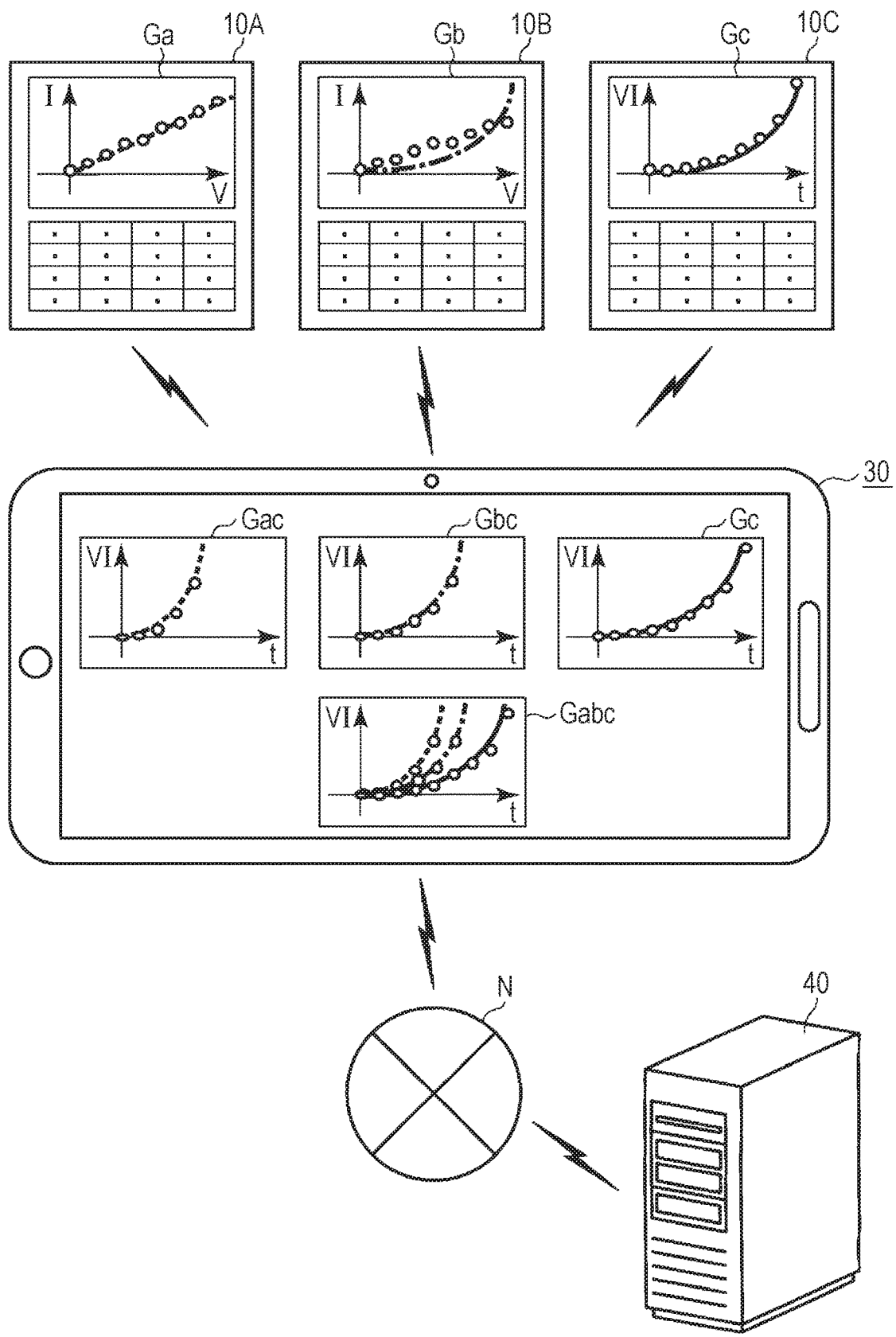
FIG. 16 is a conceptual view illustrating a configuration of a graph drawing system including the plurality of graph function calculators and the tablet terminal that utilizes a web server on a communication network.

In regard to this, the graph drawing format data, acquired in the tablet terminal 30 of the teacher from the graph function calculator 10C of the certain student C, is transmitted to and saved in a storage device (a network attached storage (NAS) or the like) of the web server 40 on a communication network N as illustrated in FIG. 16. Further, it may be configured such that the graph function calculators 10A and 10B of the other students A and B access the web server 40 and download the graph drawing format data stored in the storage device so that the measurement result graphs Gac, Gbc, and Gc of the measurement data collected by the respective calculators 10A to 10C can be displayed to be unified in any coordinate area among the coordinate areas set by the respective calculators 10A to 10C with the simple user operation.

FIG. 16 is a conceptual view illustrating a configuration of a graph drawing system including the plurality of graph function calculators 10A to 10C and the tablet terminal 30 that utilizes the web server 40 on the communication network N.

Incidentally, any method of each processing performed by the graph drawing system described in each of the above-described embodiments, that is, any of the respective methods of the measurement data analysis processing of the graph function calculator 10 illustrated in the flowchart of FIG. 7, the graph drawing processing in the measurement data analysis processing illustrated in the flowchart of FIG. 8, the terminal processing of the tablet terminal 30 illustrated in the flowcharts of FIGS. 9 and 10, the terminal processing of another embodiment of the tablet terminal 30 illustrated in the flowchart of FIG. 14, the graph drawing processing of another embodiment of the graph function calculator 10 illustrated in the flowchart of FIG. 15, and the like can be distributed in the state of being stored, as a program that can be executed by a computer, in a medium of an external recording device such as a memory card (a ROM card, a RAM card, and the like), a magnetic disk (a floppy (registered trademark) disk, a hard disk, and the like), an optical disk (a CD-ROM, a DVD, and the like), and a semiconductor memory. Further, the computer (CPU) of the electronic device or the terminal device having the display function can execute the same processing according to the above-described method by reading the program recorded in the medium of the external recording device into the storage device so that the operation is controlled by the read program to execute the measurement data analysis function and the graph drawing function of each measurement data with the unified graph drawing format in the plurality of graph function calculators 10 described in each of the above-described embodiments.

In addition, the data of the program for realizing each of the above-described methods can be transmitted on the communication network (N) as the form of a program code, and the measurement data analysis function and the graph drawing function of each measurement data with the unified graph drawing format in the plurality of graph function calculators 10 described above can be realized by fetching data of the program from a computer device (program server) connected to the communication network (N) into the electronic device or the terminal device having the display function to be stored in the storage device.

The invention of the present application is not limited to the above-described respective embodiments, and various modifications can be made in an implementation stage within a scope not departing from a gist thereof. Further, the respective embodiments include inventions of different stages, and various inventions can be extracted by combining suitably a plurality of structural requirements disclosed in the embodiments. For example, even if some are removed from all of the structural requirements illustrated in the respective embodiments or some structural requirements are combined in different modes, a configuration obtained by removing the structural requirements or combining the structural requirements can be extracted as an invention when the object described in the problem to be solved by the invention can be resolved and the effect described in the effect of the invention can be obtained.

What is claimed is:

1. A data processing device comprising:
at least one processor; and
at least one storage storing instructions that, when executed by the at least one processor, control the at least one processor to execute:
receiving (i) a first set of output information including first coordinate system setting information, and (ii) a first set of data, the first set of output information and the first set of data being transmitted from a first external device, the first coordinate system setting information specifying a first graph drawing format indicating a correspondence between a vertical axis and a horizontal axis of a first coordinate system and respective attributes, and each of the attributes being assigned to a respective one of the vertical axis and the horizontal axis of the first coordinate system;
receiving (i) a second set of output information including second coordinate system setting information, and (ii) a second set of data, the second set of output information and the second set of data being transmitted from a second external device different from the first external device, the second coordinate system setting information specifying a second graph drawing format different from the first graph drawing format, the second graph drawing format indicating a correspondence between a vertical axis and a horizontal axis of a second coordinate system and respective attributes, and each of the attributes being assigned to a respective one of the vertical axis and the horizontal axis of the second coordinate system;
selecting one of the received first and second sets of output information;
setting, as an integrated coordinate system, the one of the first coordinate system and the second coordinate system which is associated with the selected one of the received first and second sets of output information; and
generating an image including at least a first graph drawn using the first set of data and a second graph drawn using the second set of data, the generating comprising converting the one of the first coordinate system and the second coordinate system which is not set as the integrated coordinate system into the set integrated coordinate system, and drawing each of the first graph and the second graph in the set integrated coordinate system using at least one regression equation based on the setting of the integrated coordinate system, wherein at least one of the vertical axis and the horizontal axis in the first coordinate system setting information differs from the respective corresponding one of the vertical axis and the horizontal axis in the second coordinate system setting information.

2. The data processing device according to claim 1, wherein the instructions, when executed by the at least one processor, control the at least one processor to execute:

receiving, from the first external device as a part of the first set of output information, first display mode designation information designating a first display mode of a graph when generating the image;

receiving, from the second external device as a part of the second set of output information, second display mode designation information designating a second display mode of a graph when generating the image, the second display mode being different from the first display mode; and generating the image including at least the first graph and the second graph drawn in the set integrated coordinate system, the first graph being drawn in the first display mode designated by the first display mode designation information, and the second graph being drawn in the second display mode designated by the second display mode designation information.

3. The data processing device according to claim 1, wherein the instructions, when executed by the at least one processor, control the at least one processor to execute:

receiving, from the first external device as a part of the first set of output information, first regression type information designating a first type of a regression equation;

receiving, from the second external device as a part of the second set of output information, second regression type information designating a second type of a regression equation different from the first type of the regression equation; and generating the image including at least a first regression graph and a second regression graph drawn in the set integrated coordinate system, the first regression graph indicating a first regression equation obtained based on the first regression type information and the first set of data, and the second regression graph indicating a second regression equation based on the second regression type information and the second set of data.

4. The data processing device according to claim 1, wherein the data processing device reads a program from a non-transitory computer-readable recording medium on which the program is stored, and stores the read program as the instructions in the at least one storage.

5. The data processing device according to claim 1, wherein the data processing device receives a program transmitted by a server, and stores the program received from the server as the instructions in the at least one storage.

6. A system comprising:
a data processing device;
a first external device different from the data processing device; and
a second external device different from both the data processing device and the first external device, wherein the first external device outputs a first set of output information including first coordinate system setting information specifying a first graph drawing format indicating a correspondence between a vertical axis and a horizontal axis of a first coordinate system and respective attributes, each of the attributes being assigned to a respective one of the vertical axis and the horizontal axis of the first coordinate system, wherein the second external device outputs (i) a second set of output information including second coordinate system setting information, and (ii) a second set of data, the second set of output information specifying a second graph drawing format different from the first graph drawing format, the second graph drawing format indicating a correspondence between a vertical axis and a horizontal axis of a second coordinate system and respective attributes, and each of the attributes being assigned to a respective one of the vertical axis and the horizontal axis of the second coordinate system, wherein the data processing device receives, from the first external device, the first set of output information, wherein the data processing device receives, from the second external device, the second set of output information and the second set of data, wherein the data processing device generates an image including a graph drawn using the received second set of data, by converting the second coordinate system into the first coordinate system associated with the first set of output information and drawing the graph in the first coordinate system using at least one regression equation based on at least the first set of output information, and wherein at least one of the vertical axis and the horizontal axis in the first coordinate system setting information differs from the respective corresponding one of the vertical axis and the horizontal axis in the second coordinate system setting information.

7. A data processing device comprising:
at least one processor; and
at least one storage storing instructions that, when executed by the at least one processor, control the at least one processor to execute:
receiving a first set of output information including first coordinate system setting information transmitted from a first external device, the first coordinate system setting information specifying a first graph drawing format indicating a correspondence between a vertical axis and a horizontal axis of a first coordinate system and respective attributes, and each of the attributes being assigned to a respective one of the vertical axis and the horizontal axis of the first coordinate system;
receiving a second set of output information including second coordinate system setting information transmitted from a second external device different from the first external device, the second coordinate system setting information specifying a second graph drawing format different from the first graph drawing format, the second graph drawing format indicating a correspondence between a vertical axis and a horizontal axis of a second coordinate system and respective attributes, and each of the attributes being assigned to a respective one of the vertical axis and the horizontal axis of the second coordinate system;
selecting one of the received first and second sets of output information; and
transmitting the selected one set of output information to at least one of the first external device and the second external device to thereby enable the at least one of the first external device and the second external device to generate an image including at least one graph drawn by converting a coordinate system of the at least one of the first external device and the second external device into the coordinate system associated with the coordinate system setting information included in the selected one of the received first and second sets of output information, and drawing the at least one graph using a set of data of any attribute among the attributes acquired by the at least one of the first external device and the second external device such that the graph is drawn in the coordinate system associated with the coordinate system setting information included in the selected one of the received first and second sets of output information using at least one regression equation based at least on the selected one of the received first and second sets of output information, wherein at least one of the vertical axis and the horizontal axis in the first coordinate system setting information differs from the respective corresponding one of the vertical axis and the horizontal axis in the second coordinate system setting information.

8. The data processing device according to claim 7, wherein the data processing device reads a program from a non-transitory computer-readable recording medium on which the program is stored, and stores the read program as the instructions in the at least one storage.

9. The data processing device according to claim 7, wherein the data processing device receives a program transmitted by a server, and stores the program received from the server as the instructions in the at least one storage.

10. A system comprising:
a data processing device;
a first external device different from the data processing device; and
a second external device different from both the data processing device and the first external device,
wherein the first external device outputs a first set of output information including first coordinate system setting information specifying a first graph drawing format indicating a correspondence between a vertical axis and a horizontal axis of a first coordinate system and respective attributes, each of the attributes being assigned to a respective one of the vertical axis and the horizontal axis of the first coordinate system,
wherein the second external device outputs a second set of output information including second coordinate system setting information specifying a second graph drawing format different from the first graph drawing format, the second graph drawing format indicating a correspondence between a vertical axis and a horizontal axis of a second coordinate system and respective attributes, and each of the attributes being assigned to a respective one of the vertical axis and the horizontal axis of the second coordinate system,
wherein the data processing device receives, from the first external device, the first set of output information,
wherein the data processing device receives, from the second external device, the second set of output information,
wherein the data processing device selects one of the received first and second sets of output information,
wherein the data processing device transmits, to at least one of the first external device and the second external device, the selected one set of output information, and
wherein the at least one of the first external device and the second external device generates an image including at least one graph drawn by converting a coordinate system of the at least one of the first external device and the second external device into the coordinate system associated with the coordinate system setting information included in the selected one of the received first and second sets of output information, and drawing the at least one graph using a set of data of any attribute among the attributes acquired by the at least one of the first external device and the second external device such that the graph is drawn in the coordinate system associated with the coordinate system setting information included in the selected one of the received first and second sets of output information using at least one regression equation based at least on the selected one of the received first and second sets of output information, wherein at least one of the vertical axis and the horizontal axis in the first coordinate system setting information differs from the respective corresponding one of the vertical axis and the horizontal axis in the second coordinate system setting information.

* * * * *